(12) United States Patent
Miyashita et al.

(10) Patent No.: US 6,259,557 B1
(45) Date of Patent: Jul. 10, 2001

(54) DEVICE AND METHOD FOR DARK FIELD ILLUMINATION

(75) Inventors: Tomohiro Miyashita, Kiyose; Yutaka Suenaga, Yokohama, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/428,555

(22) Filed: Oct. 28, 1999

(30) Foreign Application Priority Data

Apr. 30, 1998 (JP) .................................................. 10-135955
Apr. 23, 1999 (JP) .................................................. 11-115647

(51) Int. Cl.$^7$ ............................. G02B 21/06; G03B 27/54
(52) U.S. Cl. .............................. 359/387; 359/385; 355/67
(58) Field of Search ............................ 359/368, 385–390, 359/619–623, 817, 821; 355/52–67

(56) References Cited

U.S. PATENT DOCUMENTS 4,127,318 * 11/1978 Determann et al. .................. 359/387
4,475,796 * 10/1984 Kimura ................................. 359/387
4,881,802 * 11/1989 Stankewitz ........................... 359/387
5,325,231 * 6/1994 Tamura et al. ....................... 359/387
6,049,374 * 4/2000 Komatsuda et al. .................... 355/67

FOREIGN PATENT DOCUMENTS

3425674 * 1/1986 (DE) ..................................... 359/387
58-50510 * 3/1983 (JP) ...................................... 359/385

* cited by examiner

Primary Examiner—Thong Nguyen

(57) ABSTRACT

Disclosed is a dark field illumination apparatus which is capable of performing a dark field illumination which exhibits a sufficient brightness and a sufficiently suppressed unevenness in brightness. The apparatus comprises a shaping system for shaping a light beam from a light source into approximately parallel beam having a ring-shaped section; a fly-eye optical device for forming a plurality of light source images in the vicinity of its exit plane based on the approximately parallel beam, the light source images being arranged circularly; and a light collection optical system for collecting light beams from the light source images and superposing them on an object plane.

12 Claims, 18 Drawing Sheets

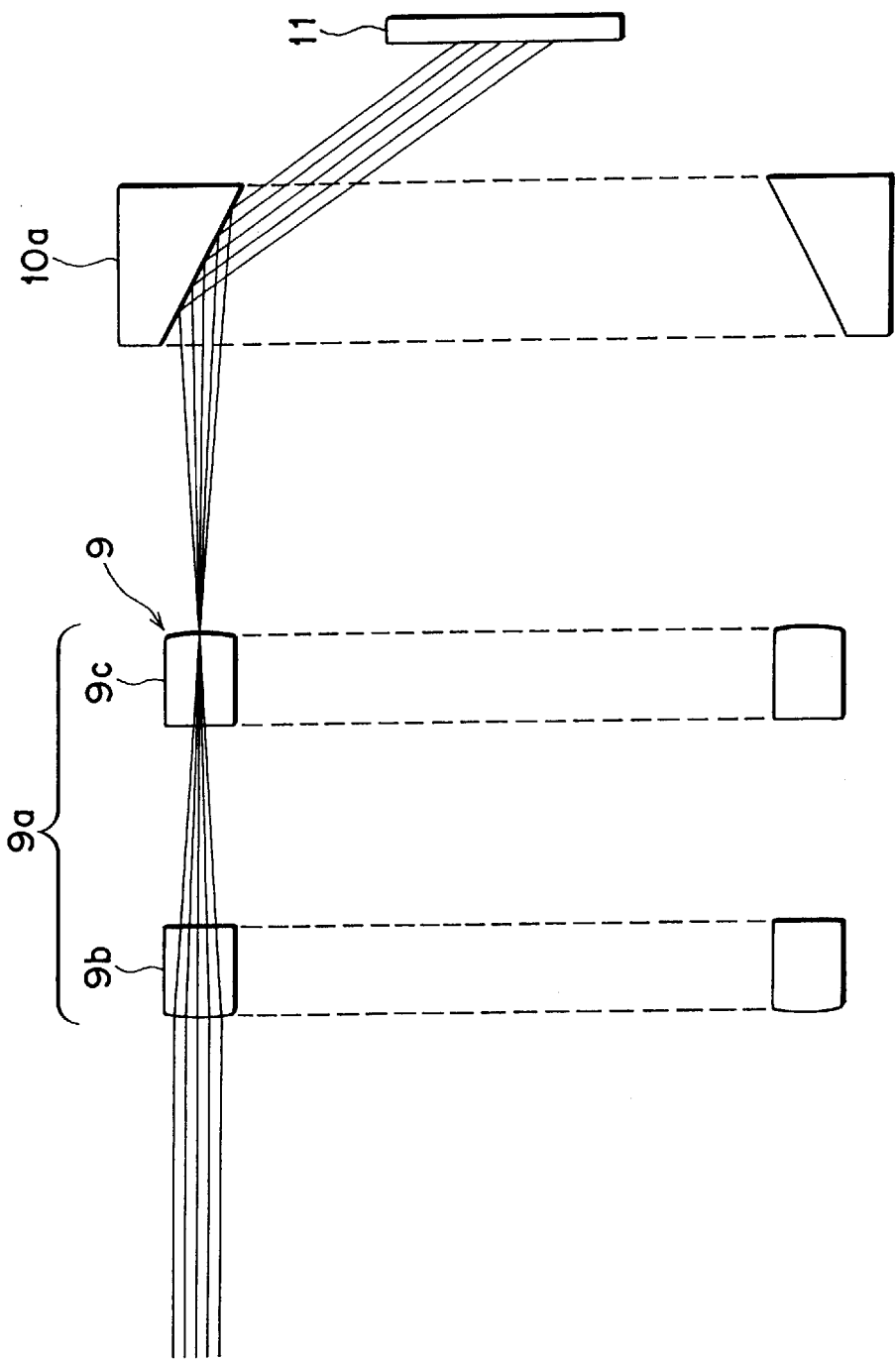

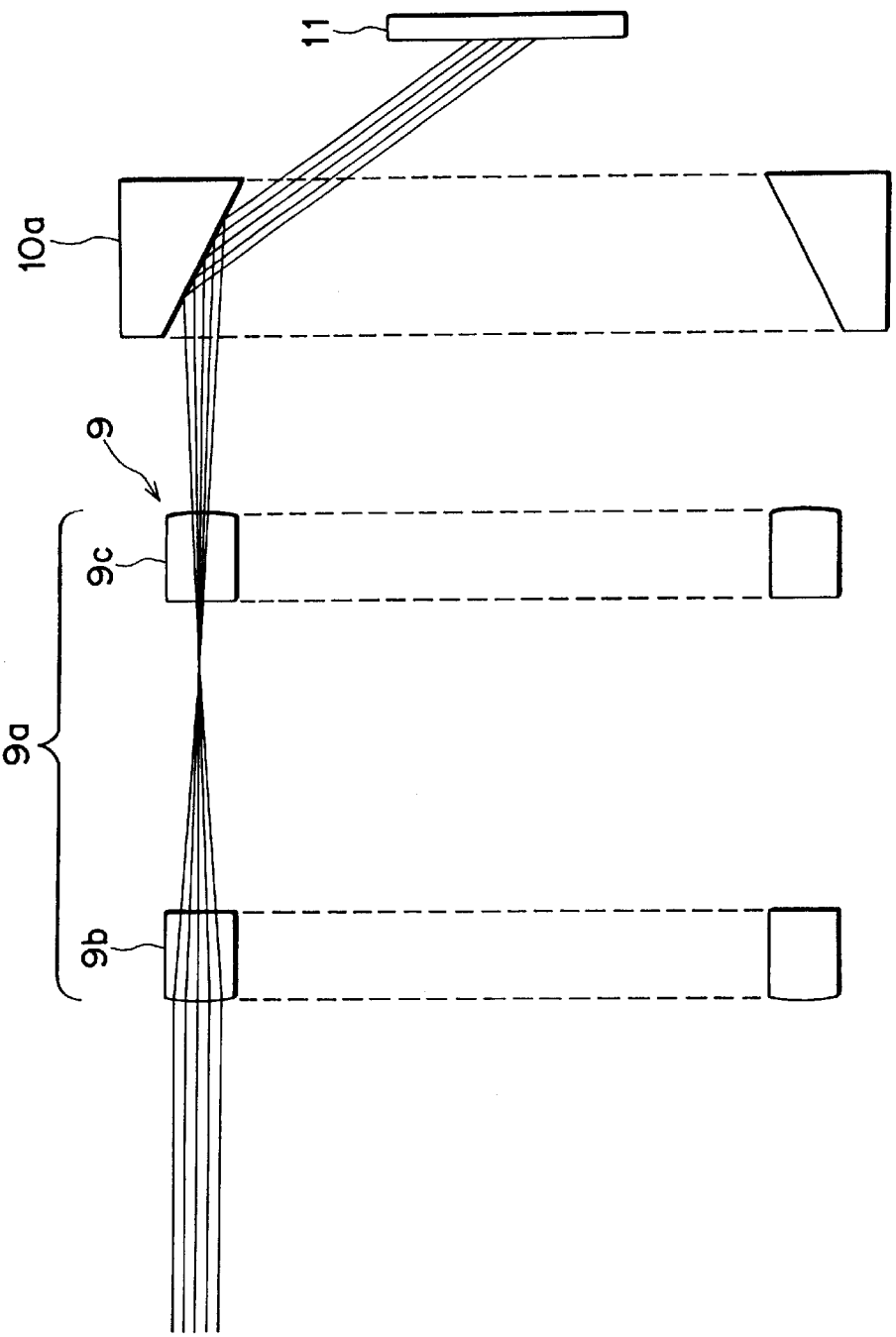

DEVICE AND METHOD FOR DARK FIELD ILLUMINATION

This application claims the benefit of Japanese Application No. 11-115647 which is hereby incorporated by reference.

BACKGROUND OF THE INVENTION

1. Field of the Invention

The present invention relates to a dark field illumination apparatus and a dark field illumination method more particularly to an epi-illumination type of dark field illumination for an object to be observed in a microscope.

2. Related Background of the Invention

In semiconductor device manufacturing steps, to inspect dusts, flaws and the like on a wafer that is a photosensitive substrate, a microscope observation using a dark field illumination has been often used. In the microscopic observation using the dark field illumination, areflection light from an object to be observed and a transmission light therefrom are not directly observed, but a scattered light from the object is observed. In the case where the object to be observed is a wafer and the like, the object can be observed with a better contrast in a dark field illumination than in a bright field illumination.

In a conventional dark field illumination apparatus, incidentally, since an optical arrangement is constructed such that an object undergoes approximately a critical illumination, illumination light is diffused so that a light beam for illumination does not form an image on a surface of the object. To be more specific, in the case where the light beam for illumination is guided into the object through a ring-shaped concave reflection mirror, the illumination light is diffused by a diffuser arranged closer to a light source than the concave reflection mirror. In this case, the light diffused by the diffuser is not incident partially onto the concave reflection mirror. In other words, a part of the light diffused by the diffuser does not contribute to the illumination, thus causing a loss of a quantity of light.

On the other hand, in the case where the light beam for illumination is guided into the object through a ring-shaped condenser lens, a diffusing film is formed on an incidence plane of the condenser lens, and the illumination light is diffused by a function of the diffusing film. In this case, a fixed diaphragm for preventing a flare is disposed in an optical path between the condenser lens and the object so that the light beam diffused by the diffusion film does not illuminate the outside of a visual field when a low magnification microscope object lens is particularly used. As a result, the part of the light passing through the condenser lens is obstructed by the fixed diaphragm and lost without contributing to the illumination. At the same time, a working distance is shortened by the disposition of the fixed diaphragm, and an operability is deteriorated.

As described above, in the conventional dark field illumination apparatus, there has been a disadvantage that a sufficient brightness cannot be obtained in an illuminated field of the object due to a loss of a quantity of light created by the diffuser or the fixed diaphragm.

Moreover, since the conventional dark field illumination apparatus does not adopt an optical arrangement for Koehler illumination, there has been a disadvantage that evenness in brightness exists in a wide visual field to be observed particularly at the time of using a low magnification microscope object lens.

SUMMARY OF THE INVENTION

The present invention was made from the viewpoint of the foregoing problems. The object of the present invention is to provide a dark field illumination apparatus and a dark field illumination method which are capable of having a sufficient brightness and performing a dark field illumination in which unevenness in brightness is sufficiently suppressed.

To solve the foregoing problems, the present invention provides a dark field illumination apparatus comprising: a light source for supplying an illumination light; a shaping system for shaping a light beam from the light source to an approximately parallel beam having a ring-shaped section; a wavefront splitting type optical integrator having a plurality of elements, which forms a plurality of light source images based on the approximately parallel beam having the ring-shaped section which is incident onto incidence planes of the plurality of elements, the light source images being arranged circularly on a predetermined plane; and a light collection optical system for collecting light beams from the plurality of light source images formed on the predetermined plane to superimpose the collected light beams on an object plane.

Here, as the optical integrator, a fly-eye optical device and the like can be used.

In the foregoing apparatus, the illumination light from the light source is shaped to the approximately parallel light beam having the ring-shaped section, and then the approximately parallel beam is incident onto the optical integrator composed of the plurality of elements. The approximately parallel beam which is incident onto a ring-shaped incidence plane of the optical integrator forms the plurality of light source images arranged circularly on the predetermined plane. The light beams from the plurality of light source images formed so as to be arranged circularly are collected by the light collection optical system, and then superimposed on the object. In this case, the illumination light performs a Koehler illumination or an illumination akin to the Koehler illumination for the object plane so as to be superposed, so that an illuminated field in which unevenness in brightness is sufficiently suppressed is formed. Moreover, unlike a case where a light beam is diffused using a diffuser or the like in prior arts, the light beam incident onto a fly-eye element does not lose substantially its quantity of light and guided into the object plane through the light collection optical system. As a result, the illuminated field having a sufficient brightness is formed.

If such a dark field illumination apparatus is built into a microscope equipped with an object lens for collecting a light beam having a numerical aperture smaller than that of the light beams which is incident onto the object plane by the light collection optical system, a visual field can be made to be bright and even in brightness, and a performance of the microscope can be improved.

According to another aspect of the present invention, provided is a dark field illumination apparatus comprising:

a light source for supplying illumination light;

a shaping system for shaping light beam from the light source to an approximately parallel beam having a ring-shaped section;

a fly-eye optical device having a plurality of lens elements, which forms a plurality of light source images circularly arranged in the vicinity of exit planes of the plurality of lens elements, based on the approximately parallel beam having the ring-shaped section, the approximately parallel beam being incident onto incidence planes of the plurality of lens elements; and a light collection optical system for collecting light beams from the plurality of light source images formed in the vicinity of an exit plane of the fly-eye optical device, and superimposing the light beams on an object plane.

In the foregoing apparatus, the illumination light from the light source is shaped to the approximately parallel beam having a ring-shaped section, and then incident onto the fly-eye optical device composed of the lens elements. The approximately parallel beam incident onto a ring-shaped incidence plane of the fly-eye optical device forms the plurality of light images circularly arranged in the vicinity of the exit plane, that is, in the vicinity of a focal plane on the rear side. The light beams from the plurality of light source images formed so as to be circularly arranged are collected by the light collection optical system, and then superimposed on the object plane upon another.

As described above, in the present invention, an approximately parallel beam or a light beam having a suitable divergence angle or a suitable convergent angle, which passes through the light collection optical system, performs a Koehler illumination or an illumination akin to the Koehler illumination for the object plane so as to be superposed. As a result, an illuminated field in which unevenness in brightness is sufficiently suppressed is formed on the object plane. Moreover, since the object plane is illuminated in the Koehler illumination state or in an illumination state akin to the Koehler illumination state in the present invention, it is unnecessary to diffuse the light beam using the diffuser and the like used in prior arts. Consequently, the light beam incident onto the fly-eye optical device does not lose substantially its quantity of light, and is guided into the object plane through the light collection optical system. As a result, an illuminated field having a sufficient brightness is formed on the object plane.

According to a preferred aspect of the present invention, the plurality of lens element composing the fly-eye optical device are arranged so as to form a cylindrical shape totally.

In the present invention, a rear focal plane of the fly-eye optical device and a front focal plane of the light collection optical system should be preferably positioned so as to be substantially coincident with each other, and a front focal plane of the fly-eye optical device and the object plane should be optically positioned approximately in conjugation with each other. In this case, the light beams from the plurality of light source images are converted to the parallel beam and the object plane undergoes the Koehler illumination, whereby the unevenness in brightness in the illuminated field can be further sufficiently suppressed.

Moreover, in the case where the front focal plane of the fly-eye optical device and its incidence plane are completely different though the rear focal plane of the fly-eye optical device and its exit plane are approximately coincident with each other, a principal ray of the light beam incident onto each lens element while forming a certain angle relative to an optical axis is emitted from each lens element while forming a certain angle relative to the optical axis. As a result, unevenness in brightness occurs in the illuminated field owing to the non-telecentric light beam. Accordingly, in order to further suppress the unevenness in brightness in the illuminated field, the front focal plane of the fly-eye optical device and its incidence plane should be approximately coincident with each other and the rear focal plane of the fly-eye optical device and its exit plane should be approximately coincident with each other.

When each lens element of the fly-eye optical device is constituted by a single lens, a length along an optical axis of the single lens is set to comparatively large so as to allow an exit plane of each lens element and its rear focal plane to be approximately coincident with each other. Accordingly, when the fly-eye optical device formed of the large number of single lenses is made of plastic and the like by a pressing work for the single lenses so as to integrate them to one constituent component, an error in manufacturing is more apt to occur as a thickness of the fly-eye optical device is larger. Accordingly, each lens element of the fly-eye optical device should be composed of a plurality of lens components arranged so as to be apart from each other at regular intervals along an optical axis of each lens element (reference optical axis), for example, a pair of lens components. In this case, since the fly-eye optical device is constituted by two constituent components, the error in manufacturing is not more prone to occur as a thickness of each constituent component of the fly-eye optical device is smaller. In addition, a length in a direction of the optical axis of the fly-eye optical device is made to be small by interposing air between the pair of lens components, thus miniaturizing the fly-eye optical device.

Moreover, according to another aspect of the present invention, provided is a dark field illumination apparatus comprising:

a light source for supplying illumination light;

a shaping system for shaping light beam from the light source to an approximately parallel beam having a ring-shaped section;

a fly-eye optical device having a plurality of lens elements, each being composed of a plurality of lens components arranged at regular intervals along a reference optical axis, which forms a plurality of light source images circularly arranged, based on the approximately parallel beam having the ring-shaped section, the approximately parallel beam being incident onto incidence planes of the lens elements; and a light collection optical system for collecting light beams from the plurality of light source images and superimposing the light beams on an object plane, wherein the fly-eye optical device changes air spaces between the plurality of the lens components, which respectively constitute the plurality of the lens elements, to change a size of an illuminated field formed on the object plane.

According to the foregoing apparatus, the illumination light from the light source is shaped into the approximately parallel beam having the ring-shaped section, and then incident onto the fly-eye optical device composed of the plurality of the lens elements. Here, each lens element is composed of a plurality of lens components, for example, a pair of lens components, arranged at regular intervals along an optical axis in order that the air spaces between the plurality of lens components can be changed. The approximately parallel beam incident onto the ring-shaped incidence plane of the fly-eye optical device forms a plurality of light source images arranged circularly. The light beams from the plurality of light source images are collected by the light collection optical system, and then superimposed on the object plane.

In this case, when the air spaces between the pair of lens components constituting each lens element are changed, a composite focal length of the pair of lens components changes, a divergence angle of the light beams which are emitted from the fly-eye optical device and then incident onto the light collection optical system change. As a result, by changing the air space between the pair of the lens components, a size of the illuminated field formed on the object plane can be adjusted without changing a distance between the light collection optical system and the object plane, that is, a working distance. Specifically, compared to the prior arts in which the size of the illuminated field must be adjusted by defocusing the light collection optical system or the fixed diaphragm, an operability is improved in the present invention in a point that the working distance does not change in adjusting the size of the illuminated field.

Moreover, in the present invention, as described later, a set of the fly-eye optical device, and the light collection optical device is used, in accordance with a numerical aperture and visual field of each object lens of the microscope. If the fly-eye optical device is manufactured by a pressing work using a material such as plastic, a cost is not increased significantly. Moreover, in the present invention, since the diffuser or the diffusion film used in the prior arts as described above is unnecessary, a treatment with chemical corrosion becomes unnecessary, so that the present invention is more advantageous than the prior arts in a manufacturing cost.

Furthermore, a plurality of object lens having different magnifications are fitted to a rotary revolver in a microscope, and an object lens having a desired magnification is selectively positioned on an image formation optical path by a rotation of this revolver. In this case, since a numerical aperture and a visual field substantially differ in accordance with a magnification of each object lens, a fly-eye optical device and a light collection optical system must be provided for each object lens in order to form a good illuminated field having a size corresponding to the visual field by light beam having a numerical aperture larger than that of each object lens. For this reason, the fly-eye optical device and the light collection optical device should be arranged closer to an object plane than to a phrusting surface of the object lens.

With such constitution, a set of the fly-eye optical device and the light collection optical system can be integrally attached to each of the plural object lens which is selectively positioned on the image formation optical path of the microscope. In switching the object lens, a good operability can be secured without urging a tester to an excessive operation. If the fly-eye optical device and the light collection optical system are disposed within a microscope main body, a good illumination itself not only tends to be impossible, but also the tester is urged to perform an excessive operation every time of switching the object lens, thus significantly deteriorating the operability.

Furthermore, if aberration is left in the light collection optical system to some extent, the conversion of the light beams from the plurality of light source images to the parallel beam becomes impossible. As a result, an illuminated field having somewhat unevenness in brightness is formed on the object plane. Accordingly, in the case where a ring-shaped lens component is used as the light collection optical system, it should be preferable that the light collection optical system has less aberration as possible by introducing an aspheric surface into at least one plane of the lens component. Alternatively, instead of a refraction system like the lens component, it should be preferable to further suppress the unevenness in brightness in the illuminated field by using a ring-shaped parabolic concave reflection mirror as the light collection optical system which has in principle no aberration.

Furthermore, according to another aspect of the present invention, provided is a dark field illumination method comprising the steps of:

shaping illumination light from a light source into approximately parallel beam having a ring-shaped section;

forming a plurality of light source images arranged circularly on a predetermined plane, based on the approximately parallel beam having the ring-shaped section; and collecting light beams from the plurality of light source images formed so as to be arranged circularly on the predetermined plane, and superimposing the light beams on an object plane.

BRIEF DESCRIPTION OF THE DRAWINGS

FIG. 17 is a sectional view showing a structure of a principal part of a fifth modification example, which shows a state in which the air space between the pair of lens components constituting each lens element of the fly-eye optical device is comparatively narrow; and FIG. 18 is a sectional view showing a structure of a principal part of the fifth modification example, which shows a view showing a state in which the air space between the pair of lens components constituting each lens element of the fly-eye optical device is comparatively wide.

DESCRIPTION OF THE PREFERRED EMBODIMENTS

An embodiment of the present invention will be described below with reference to the accompanying drawings.

Figure 1:
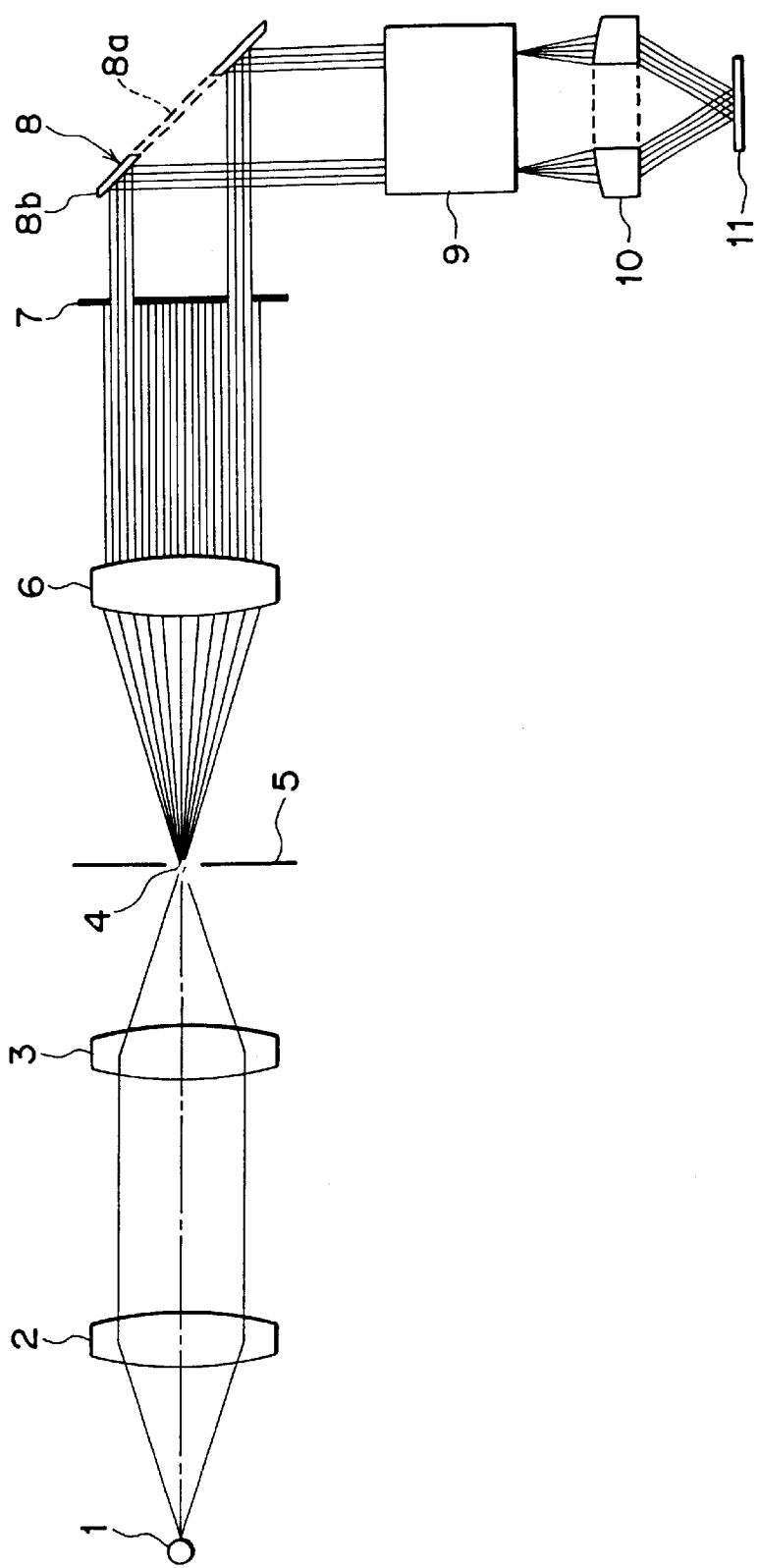
FIG. 1 is a view schematically showing a total structure of a dark field illumination apparatus according to an embodiment of the present invention.
Figure 2:
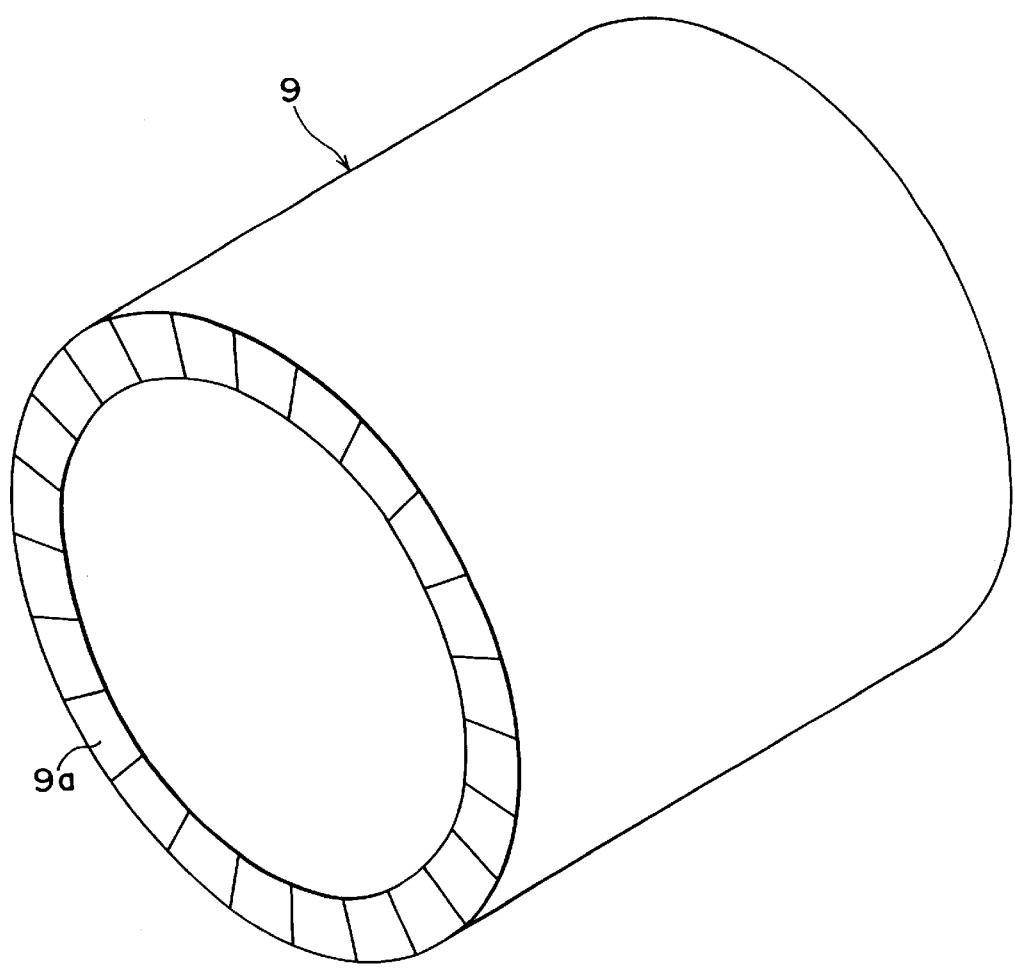
FIG. 2 is an enlarged perspective view schematically showing a structure of a fly-eye optical device of FIG. 1.
Figure 3:
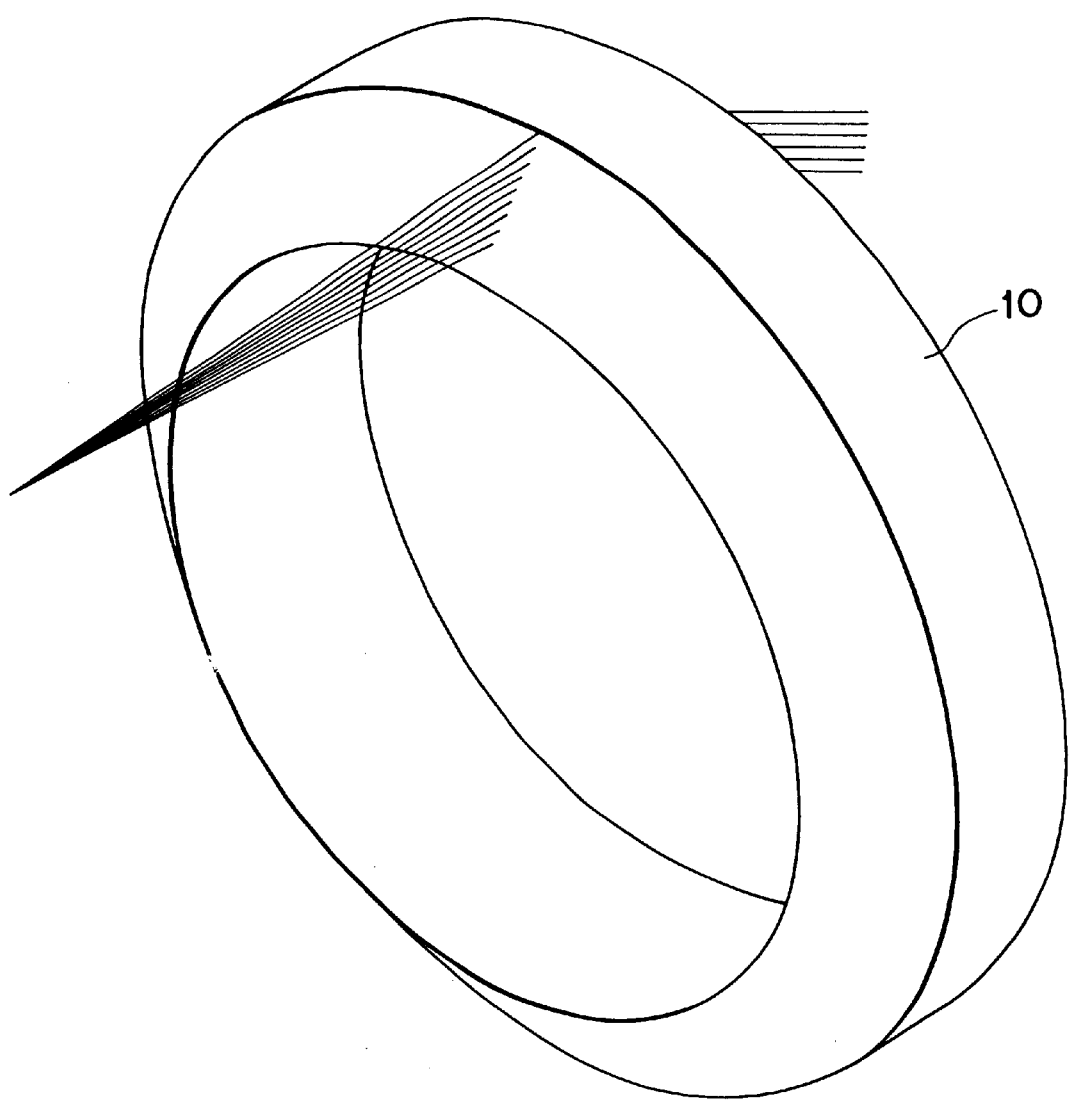
FIG. 3 is an enlarged perspective view schematically showing a structure of a condenser lens of FIG. 1, that is, a light collection optical system.

FIG. 1 is a view schematically showing a total structure of a dark field illumination apparatus according to an embodiment of the present invention. FIG. 2 is an enlarged perspective view schematically showing a structure of the fly-eye optical device of FIG. 1. Furthermore, FIG. 3 is an enlarged perspective view schematically showing a structure of a condenser lens of FIG. 1.

The dark field illumination apparatus of this embodiment comprises a light source 1 for supplying illumination light as shown in FIG. 1. Note that, for example, a halogen lamp can be used as the light source 1. A light from the light source 1 is converted to approximately parallel beam through a collector lens 2, and then forms a light source image 4 via a light collection lens 3. An aperture diaphragm 5 is disposed in the vicinity of a position where the light source image 4 is formed. A light from the light source image 4 travelling through the aperture diaphragm 5 travels through a field lens 6 to be converted to approximately parallel beam. Thereafter, the parallel beam is incident onto a beam expander (not shown). The beam expander is composed of, for example, a negative lens and a positive lens, which are arranged so that the negative lens is closer to the light source than the positive lens.

Accordingly, by an operation of the negative and positive lenses, the light beam incident onto the beam expander is made to be approximately parallel beam having a magnified beam diameter, and then incident onto a ring diaphragm 7. The ring diaphragm 7 has a ring-shaped opening portion having a center around the optical axis. Then, the beam expander magnifies the beam diameter in accordance with an outside diameter of the opening portion of the ring diaphragm 7. The approximately parallel beam having a ring-shaped section, which passes through the opening portion of the ring diaphragm 7, is incident onto a hollow reflection mirror 8. The hollow reflection mirror 8 is constituted by an opening portion 8a having a circular shape in total, formed in its center portion, and a reflection portion 8b having a ring shape in total, formed outside the opening portion 8a.

The approximately parallel beam having the ring-shaped section, which is reflected by the reflection portion 8b of the hollow reflection mirror 8, is incident onto a fly-eye optical device 9. The fly-eye optical device 9 is constructed by disposing many lens elements 9a so as to form totally a cylindrical shape extending along the optical axis, as shown in FIG. 2. Accordingly, an incidence plane and an exit plane of the fly-eye optical device 9 are formed to have a ring shape corresponding to a section of the incident light beam. Each lens element 9a is a positive single lens which has an incidence plane having a convex surface facing the light source side and an exit plane having a convex surface facing the object side. Each lens element 9a is formed so that its front focal plane on the light source side and its incidence plane are approximately coincident with each other and its rear focal plane and its exit plane are approximately coincident with each other.

Accordingly, the approximately parallel beam having the ring-shaped section, which is incident onto the fly-eye optical device 9, is divided two-dimensionally by many lens elements 9a, and forms light source images of the same number as that of the lens elements 9a on its rear focal plane, that is, in the vicinity of its exit plane. In other words, the fly-eye optical device 9 forms many light source images circularly arranged in the vicinity of its exit plane, based on the approximately parallel incident beam having the ring-shaped section. The light beam from many light source images, which are formed so as to be circularly arranged by the fly-eye optical device 9, is collected by a ring-shaped condenser lens 10 as shown in FIG. 3, and then superimposed at a predetermined area on an object plane 11.

Figure 4:
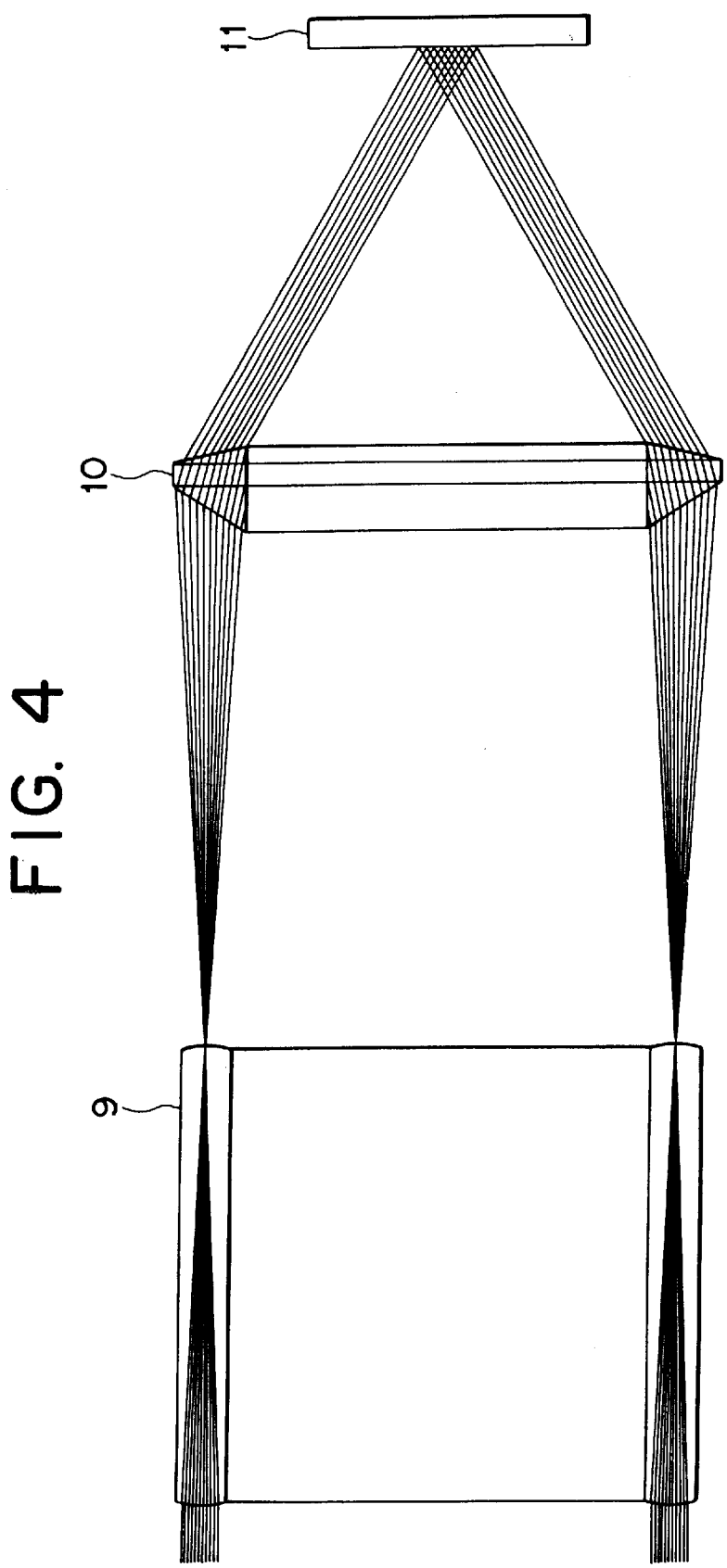
FIG. 4 is a view showing a state in which light beams from light source images which are formed close to an exit plane of the fly-eye optical device based on parallel beam having a comparatively large section, are collected and superimposed at a predetermined area on an object plane by the circular condenser lens.
Figure 5:
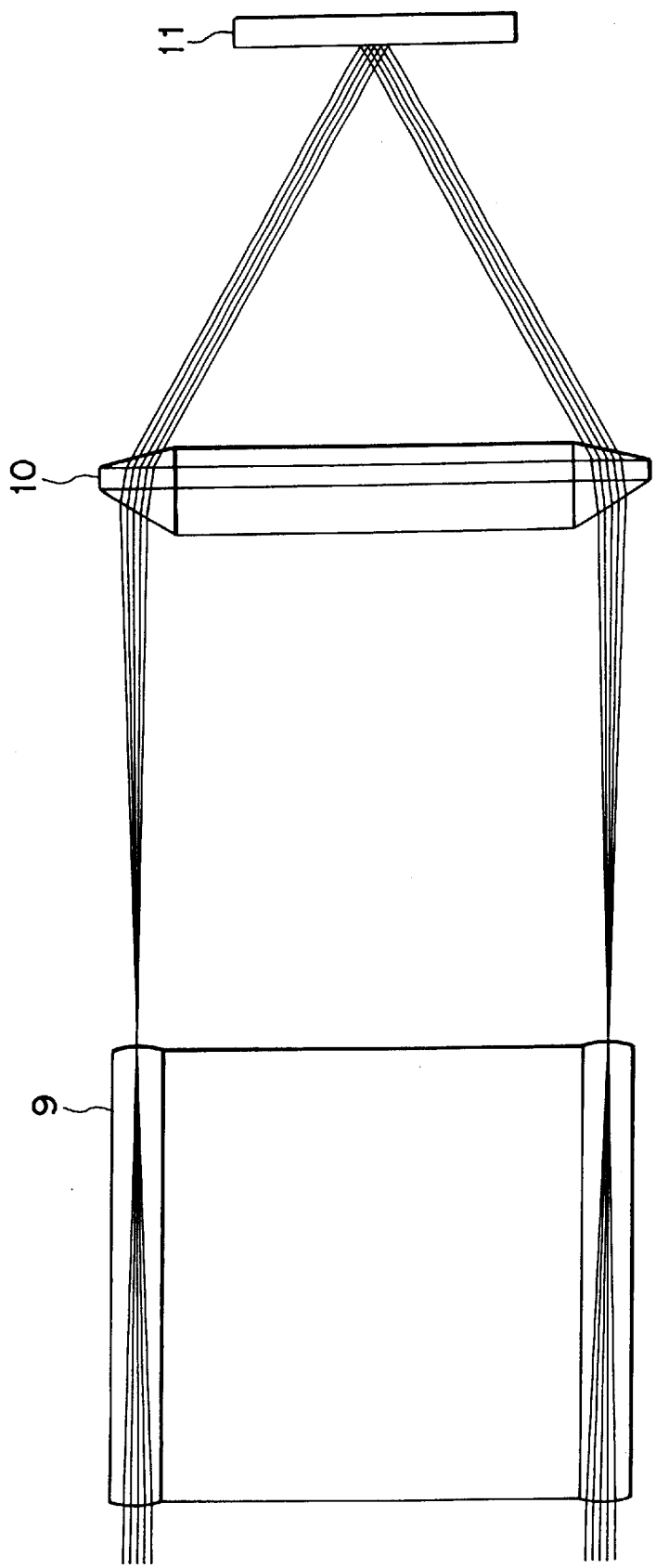
FIG. 5 is a view showing a state in which light beams from light source images which are formed close to an exit plane of the fly-eye optical device based on parallel beam having a comparatively small section, are collected and superimposed at a predetermined area on an object plane by the circular condenser lens.

FIGS. 4 and 5 are views showing a state in which the light beam from the light source image formed in the vicinity of the exit plane of the fly-eye optical device 9 is collected by the ring-shaped condenser lens 10 and superimposed at the predetermined area on the object plane 11. Note that compared to FIG. 4 in which parallel beam having a comparatively large section is supplied to the fly-eye optical device 9, parallel beam having a comparatively small section is supplied to the fly-eye optical device 9 in FIG. 5.

As shown in FIGS. 4 and 5, the fly-eye optical device 9 and the condenser lens 10 are disposed so that the rear focal plane of the fly-eye optical device 9, that is, the exit plane thereof, and the front focal plane of the condenser lens 10 are approximately coincident with each other. Moreover, the object plane 11 is disposed so that the rear focal plane of the condenser lens 10 and the object plane 11 are approximately coincident with each other. Accordingly, the light beam from many light source images formed by the fly-eye optical device 9 is converted into the approximately parallel beam by the condenser lens 10, and then illuminates the predetermined area of the object plane 11, so as to be superposed.

As described above, in the dark field illumination apparatus of FIG. 1, the rear focal plane of the fly-eye optical device 9, that is, the exit plane thereof, and the light source 1 (and the light source image 4 and the aperture diaphragm 5) are made to be approximately conjugated with each other optically. Moreover, the front focal plane of the fly-eye optical device 9, that is, the incidence plane thereof, and the object plane 11 are made to be approximately conjugated with each other optically. In other words, the incidence plane of each lens element of the fly-eye optical device 9 constitutes an illumination visual field diaphragm plane. Accordingly, a comparatively large illuminated field is formed on the object plane 11 in FIG. 4 which shows a state in which the parallel beam having the comparatively large section is supplied to the fly-eye optical device 9. Compared with FIG. 4, in FIG. 5 showing a state in which the parallel beam having the comparatively small section is supplied to the fly-eye optical device 9, a comparatively small illuminated field is formed on the object plane 11.

Figure 6:
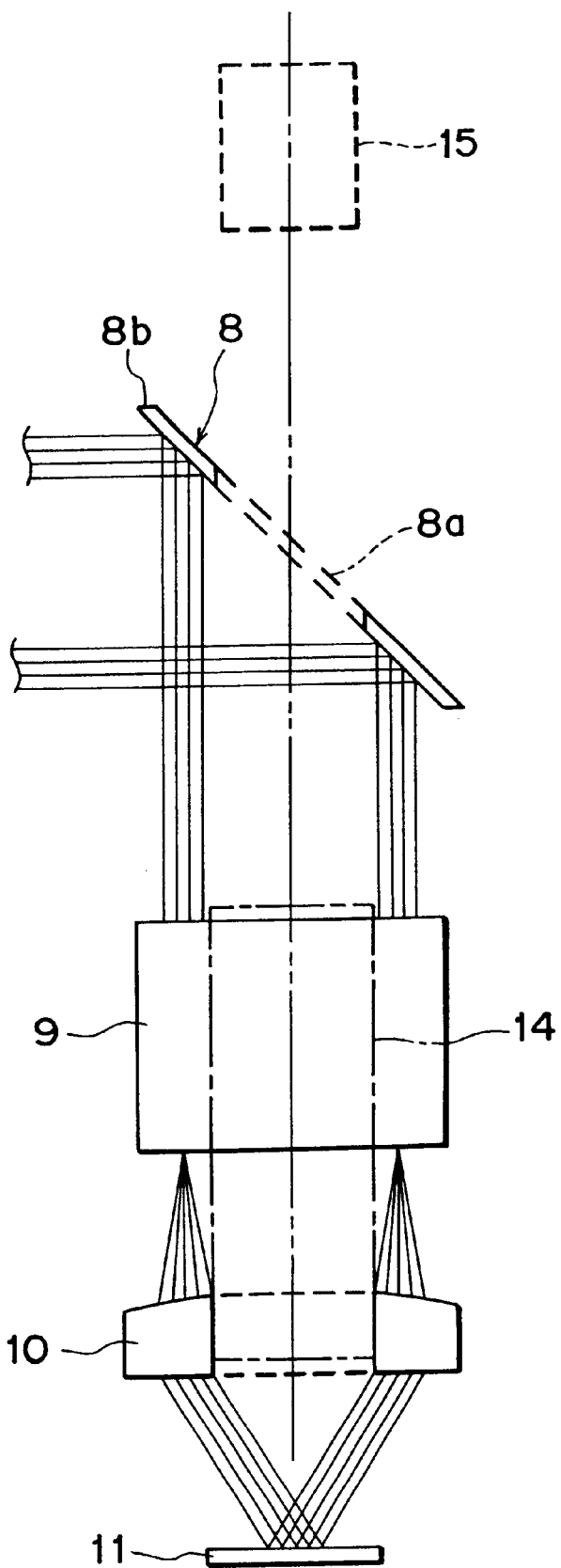
FIG. 6 is a view showing an enlarged part of the dark field illumination apparatus shown in FIG. 1.

FIG. 6 is a partially enlarged view of the apparatus of FIG. 1. An object lens 14 of a microscope is disposed so that the object lens 14 penetrates the hollow portion of the cylindrical fly-eye optical device 9 and the hollow portion of the ring-shaped condenser lens 10. Specifically, a set of the fly-eye optical device 9 and the condenser lens 10 in accordance with a numerical aperture and a visual field of the object lens 14 of the microscope are integrally fitted to the object lens 14. Accordingly, a reflection light from the object plane 11 which undergoes a darkfield illumination is not allowed to be incident onto the object lens 14, and only a scattered light from the object plane 11 forms a dark field image through the object lens 14 and the opening portion 8a of the hollow reflection mirror 8, and the formed dark field image is observed through an observation optical system 15 such as an eyepiece, a CCD camera and the like.

As described above, the dark field illumination apparatus of this embodiment is constructed such that the front focal plane of the fly-eye optical device 9 and the incidence plane thereof are approximately coincident with each other, and the rear focal plane of the fly-eye optical device 9 and the exit plane thereof are approximately coincident with each other. The dark field illumination apparatus of this embodiment is also constructed such that the rear focal plane of the fly-eye optical device 9 and the front focal plane of the condenser lens 10 are approximately coincident with each other, and the rear focal plane of the condenser lens 10 and the object plane 11 are approximately coincident with each other. The light beams from the many light source images formed by the fly-eye optical device 9 are converted to the approximately parallel beams by the condenser lens 10, and then perform the Koehler illumination for the same area of the object plane 11 so as to be superposed. As a result, the illuminated field in which the unevenness in brightness is sufficiently suppressed is formed. Moreover, since unlike the prior arts, the light beam needs not to be diffused using the diffuser because the object plane undergoes the Koehler illumination, the light beam incident onto the fly-eye optical device 9 does not lose the quantity of light substantially, but is guided to the object plane 11 via the condenser lens 10. Consequently, the illuminated field having a sufficient brightness is formed on the object plane 11.

Figure 7:
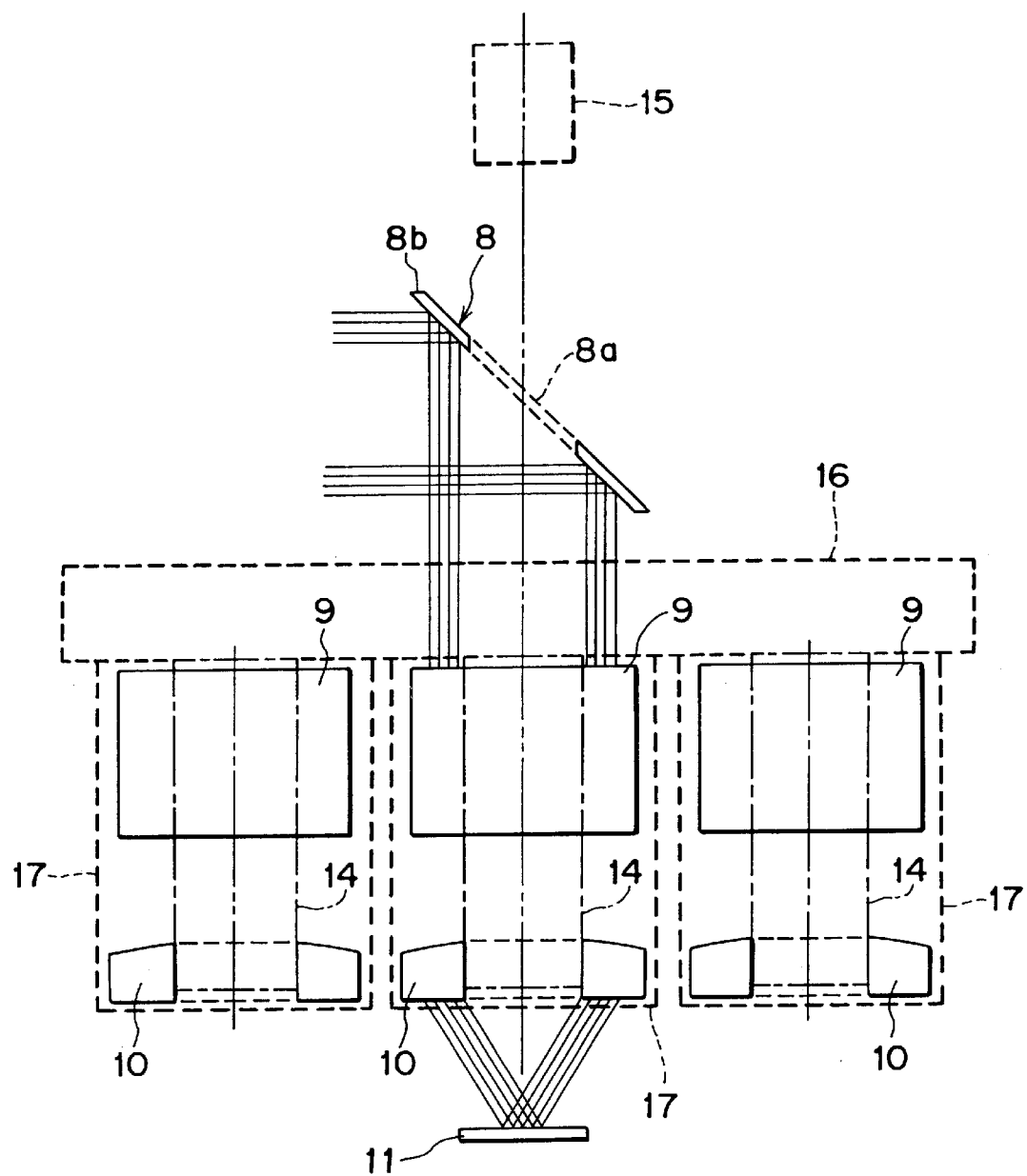
FIG. 7 shows an example in which the apparatus of FIG. 6 is built into another microscope.

FIG. 7 shows an example in which the dark field illumination apparatus of FIG. 6 is incorporated into another microscope. In this microscope, a plurality of interchangeable units 17 is fitted with a rotary revolver 16. Object lenses 14 having different magnifications are incorporated into the corresponding interchangeable units 17. By a rotation of the revolver 16, one of the object lenses 14 having a desired magnification is selectively positioned on an image formation optical path.

Around each object lens 14, a set of the fly-eye optical device 9 and the condenser lens 10 is integrally fitted closer to the object side than to the phrusting (routing) surface. The first reason why the fly-eye optical device 9 and the condenser lens 10 are provided around each object lens 14 is that the numerical aperture of the object lens 14 and the visual field thereof are different from others in accordance with the magnification of the object lens 14. The second reason is to form a good illuminated field having a size in accordance with the visual field of the object lens 14 by the light beam of a numerical aperture larger than that of each object lens 14 is aimed at.

Note that, in the foregoing embodiment, the ring-shaped condenser lens 10 is used as the light collection optical system for collecting the light beams from many light source images formed by the fly-eye optical device 9 to superpose them on the object plane 11. In this case, if the condenser lens 10 holds aberration left therein to some extent, it will be impossible to convert the light beams from many light source images to the parallel light beam. As a result, an illuminated field having somewhat unevenness in brightness is formed on the object plane 11. Accordingly, in the foregoing embodiment, in order to suppress the unevenness in brightness more sufficiently, the condenser lens 10 should be constructed by introducing an aspherical surface into at least one of the plane of the condenser lens 10 on the light source side and the plane thereof on the object side so that the condenser lens 10 offers aberration as little as possible. In other words, in a first modification example of the foregoing embodiment, if a ring-shaped parabola concave reflection mirror that is in principle a stigmatic light collection optical system is used instead of a refractive system such as the condenser lens 10, it is possible to suppress the unevenness in brightness in the illuminated field more sufficiently than in the foregoing embodiment.

Advantages of the foregoing embodiment and the first modification example will be verified below based on concrete numerical examples.

FIRST NUMERICAL EXAMPLE

A first numerical example concerns an apparatus which performs a dark field illumination for a microscope object lens having a fivefold magnification, that is, a low magnification object lens, and the apparatus uses a condenser lens as the light collection optical system based on the constitution of the foregoing embodiment. This condenser lens is a ring-shaped biconvex lens, and a lens surface on the light source side is formed to be aspheric.

Since in each of the numerical examples, the aspheric surface of the condenser lens has a conic constant $\kappa$ of $-1$, the following formula (a) is established.

$$x = A_0 \cdot y^2/2 + A_2 \cdot y^2 + A_4 \cdot y^4 + A_6 \cdot y^6 + A_8 \cdot y^8 + A_{10} \cdot y^{10} \quad (a)$$

where y is a height in a direction perpendicular to the optical axis, x is a distance along the optical axis from a tangent plane at a vertex of an aspheric surface to the aspheric surface in the height y, and $A_n$ is an n-order aspheric surface coefficient.

Specific values in the fly-eye optical device and the condenser lens in the first numerical example are listed in Table 1. Note that a refractive index shows a value for a d line ($\lambda$=587.6 nm).

TABLE 1

| [Data of Fly-Eye Optical Device] | |
|---|---|
| Curvature Radius of Incidence Plane | 8.25 |
| Curvature Radius of Exit Plane | −8.25 |
| Focal Length | 25 |
| Thickness (Length in Optical Axis Direction) | 25 |
| Refractive Index | 1.501 |
| Abbe Number | 56.2 |
| Number of Lens Elements | 24 |
| [Data of Condenser Lens] | |
| Curvature Radius of Incidence Plane see aspheric surface data | |
| Curvature Radius of Exit Plane | −70 |
| Focal Length | 27.5 |
| Thickness (Length in Optical Axis Direction) | 9 |
| Refractive Index | 1.516 |
| Abbe Number | 64.1 |

TABLE 1-continued (aspheric surface data)

| | |
|---|---|
| Curvature Radius of Vertex R | 17 |
| Aspheric Surface Coefficient $A_0$ | 0 |
| Aspheric Surface Coefficient $A_2$ | $0.2941 \times 10^{-1}$ |
| Aspheric Surface Coefficient $A_4$ | $0.4713 \times 10^{-5}$ |
| Aspheric Surface Coefficient $A_6$ | $-0.1162 \times 10^{-7}$ |
| Aspheric Surface Coefficient $A_8$ | $-0.3743 \times 10^{-10}$ |
| Aspheric Surface Coefficient $A_{10}$ | $0.3776 \times 10^{-13}$ |

Figure 8:
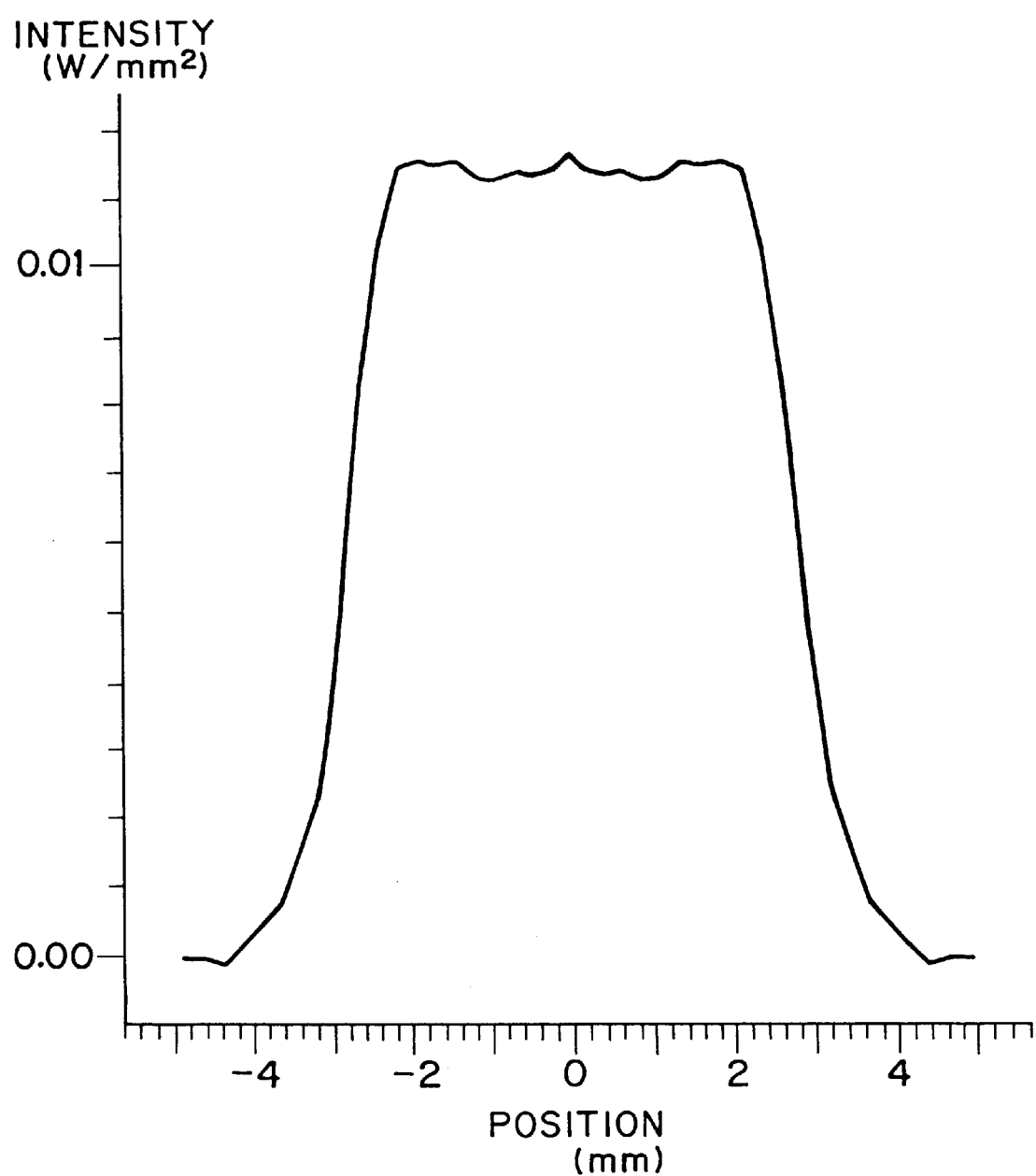
FIG. 8 is a graph showing an intensity distribution of an illuminated field formed on the object plane in a first numerical example.

FIG. 8 is a graph showing an intensity distribution of an illuminated field formed on an object plane in the first numerical example. In FIG. 8, the abscissa shows a distance (mm) from a center of the illuminated field (center of the visual field), and the ordinate shows a light intensity (W/mm$^2$), respectively. Referring to FIG. 8, it is proved that a sufficient brightness is secured in a required visual field (diameter of 5 mm) for a fivefold magnification object lens of a microscope and unevenness in brightness in the illuminated field is sufficiently suppressed.

SECOND NUMERICAL EXAMPLE

A second numerical example concerns an apparatus which performs a dark field illumination for a tenfold object lens of a microscope, that is, an intermediate magnification object lens, and the apparatus uses a condenser lens as the light collection optical system based on the constitution of the foregoing embodiment in the apparatus. Similarly to the apparatus in the first numerical example, this condenser lens is a ring-shaped biconvex lens, and a lens surface on the light source side is formed to be aspheric. However, dimensions of the numerical values in the second numerical example differ from those in the first numerical example.

Specific values of a fly-eye optical device and a condenser lens in the second numerical example are listed in the following Table 2. Note that a refractive index shows a value for a d line ($\lambda$=587.6 nm).

TABLE 2

[Data of Fly-Eye Optical Device]

| | |
|---|---|
| Curvature Radius of Incidence Plane | 6.6 |
| Curvature Radius of Exit Plane | -6.6 |
| Focal Length | 20 |
| Thickness (Length in Optical Axis Direction) | 20 |
| Refractive Index | 1.501 |
| Abbe Number | 56.2 |
| Number of Lens Elements | 24 |
| [Data of Condenser Lens] | |
| Curvature Radius of Incidence Plane | |
| see aspheric surface data | |
| Curvature Radius of Exit Plane | -40.0 |
| Focal Length | 20.0 |
| Thickness (Length in Optical Axis Direction) | 13 |
| Refractive Index | 1.516 |
| Abbe Number | 64.1 |
| (aspheric surface data) | |
| Curvature Radius of Vertex R | 17 |
| Aspheric Surface Coefficient $A_0$ | 0 |
| Aspheric Surface Coefficient $A_2$ | $0.3125 \times 10^{-1}$ |
| Aspheric Surface Coefficient $A_4$ | $-0.2495 \times 10^{-5}$ |
| Aspheric Surface Coefficient $A_6$ | $-0.4253 \times 10^{-7}$ |
| Aspheric Surface Coefficient $A_8$ | $-0.1547 \times 10^{-9}$ |
| Aspheric Surface Coefficient $A_{10}$ | $0.3813 \times 10^{-12}$ |

Figure 9:
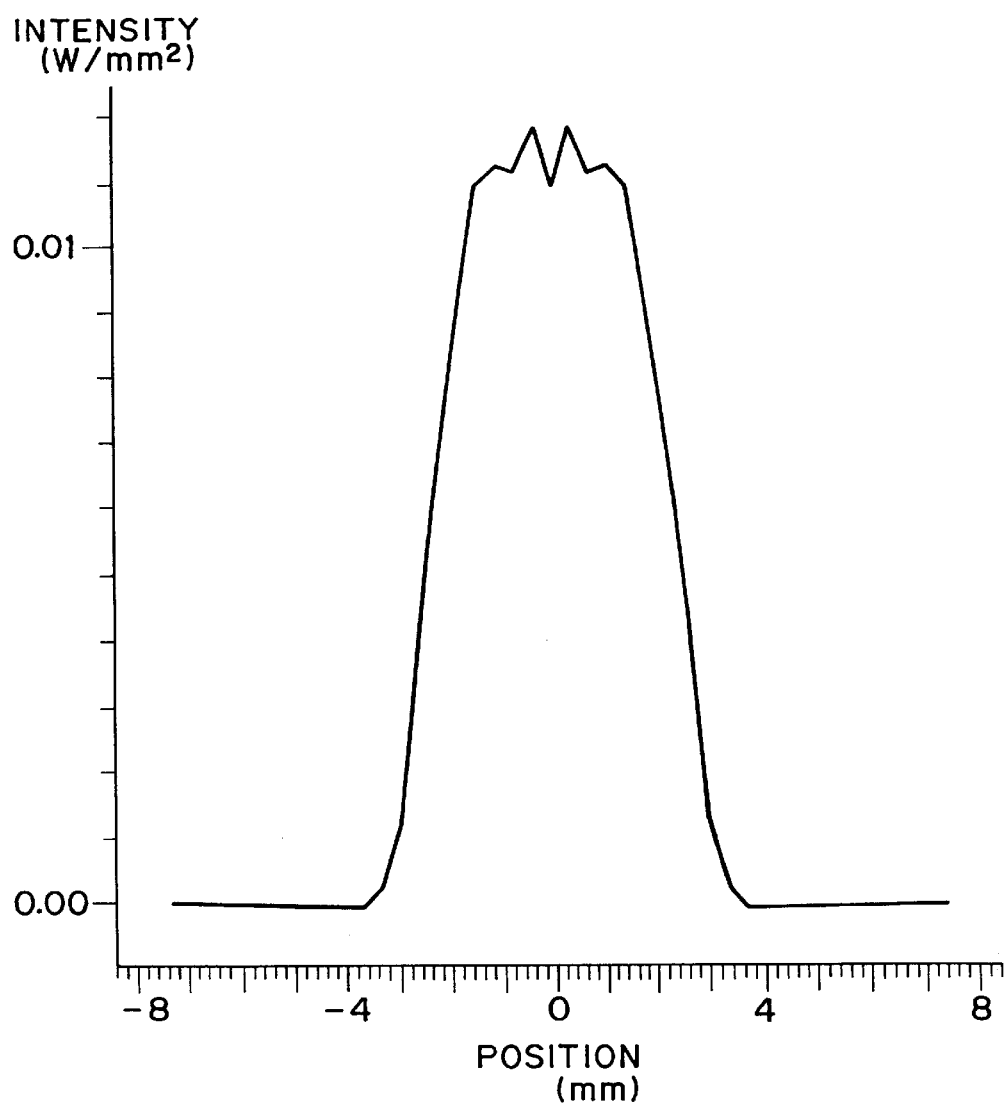
FIG. 9 is a graph showing an intensity distribution of an illuminated field formed on the object plane in a second numerical example.

FIG. 9 is a graph showing an intensity distribution of an illuminated field formed on an object plane in the second numerical example. In FIG. 9, the abscissa shows a distance (mm) from a center of the illuminated field (center of the visual field), and the ordinate shows a light intensity (W/mm$^2$), respectively. Referring to FIG. 9, it is proved that a sufficient brightness is secured in a required visual field (diameter of 2.5 mm) for a tenfold magnification object lens of a microscope and unevenness in brightness in the illuminated field is sufficiently suppressed.

THIRD NUMERICAL EXAMPLE

A third numerical example concerns an apparatus which performs a dark field illumination for a microscope object lens having a twenty-fold magnification, that is, a high magnification object lens, and the apparatus uses a parabola concave reflection mirror as the light collection optical system based on the foregoing first modification example. A parabola plane of the parabola concave reflection mirror is represented by the following formula (b) when y is a height in a direction perpendicular to the optical axis, x is a distance along the optical axis from a tangent plane at a vertex of an parabola plane to the parabola plane in the height y, and $\kappa$ is a conic constant.

$$x=(A \cdot y^2)/[1+\{1-(1+\kappa)A^2 \cdot y^2\}^{1/2}] \tag{b}$$

where a coefficient A is 1/R
(R: curvature radius of vertex)

Specific values of the fly-eye optical device and the parabola concave reflection mirror in the third numerical example are listed in the following Table 3. Note that a refractive index shows a value for a d line ($\lambda$=587.6 nm). Moreover, the fly-eye optical device in the third numerical example has the same dimensions as those of the fly-eye optical device in the first numerical example.

TABLE 3

[Data of Fly-Eye Optical Device]

| | |
|---|---|
| Curvature Radius of Incidence Plane | 8.25 |
| Curvature Radius of Exit Plane | -8.25 |
| Focal Length | 25 |
| Thickness (Length in Optical Axis Direction) | 25 |
| Refractive Index | 1.501 |
| Abbe Number | 56.2 |
| Number of Lens Elements | 24 |
| [Data of Parabola Concave Reflection Mirror] | |
| Curvature Radius of Vertex R | 8 |
| Focal Length (= R/2) | 4 |
| Conic Constant $\kappa$ | -1 |
| Coefficient A (= 1/R) | 0.125 |

Figure 10:
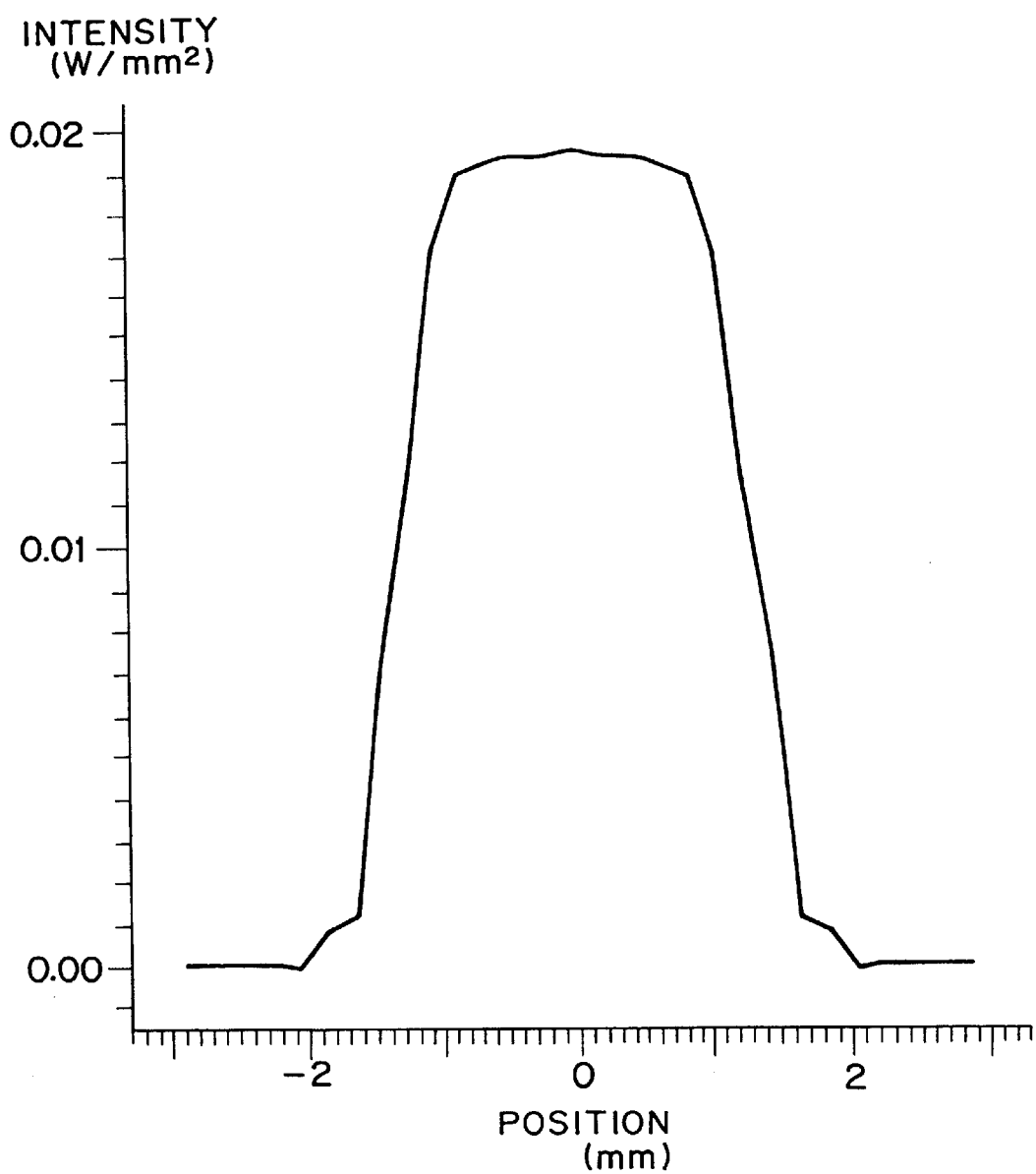
FIG. 10 is a graph showing an intensity distribution of an illuminated field formed on the object plane in a third numerical example.

FIG. 10 is a graph showing an intensity distribution of an illuminated field formed on an object plane in the third numerical example. In FIG. 10, the abscissa shows a distance (mm) from a center of the illuminated field (center of the visual field), and the ordinate shows a light intensity (W/mm$^2$), respectively. Referring to FIG. 10, it is proved that a sufficient brightness is secured in a required visual field (diameter of 1.25 mm) for a twenty-fold magnification object lens of a microscope and unevenness in brightness in the illuminated field is sufficiently suppressed.

Figure 11:
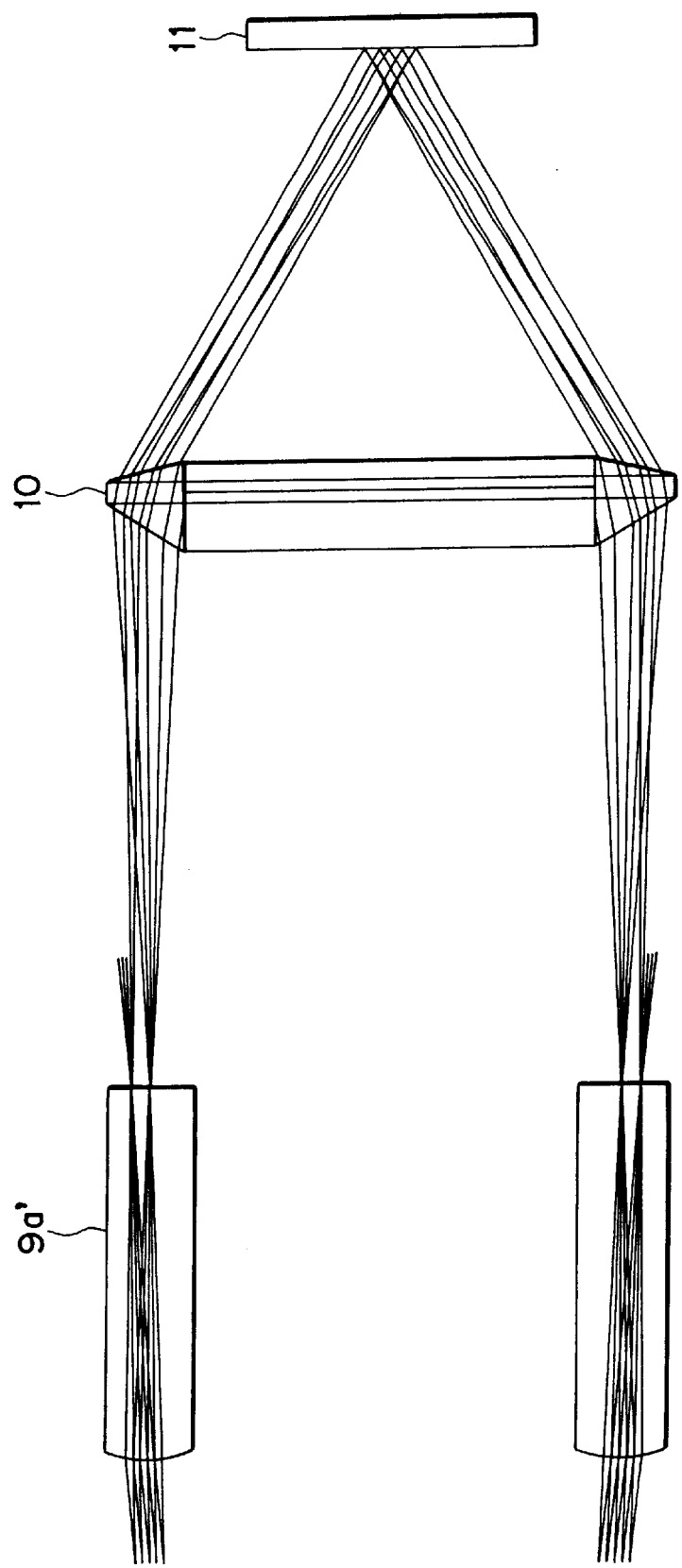
FIG. 11 is a view showing a structure of a principal part of a second modification example in which a rear focal plane of the fly-eye optical device is approximately coincident with an exit plane thereof and a front focal plane thereof is quite different from an incidence plane thereof.
Figure 12:
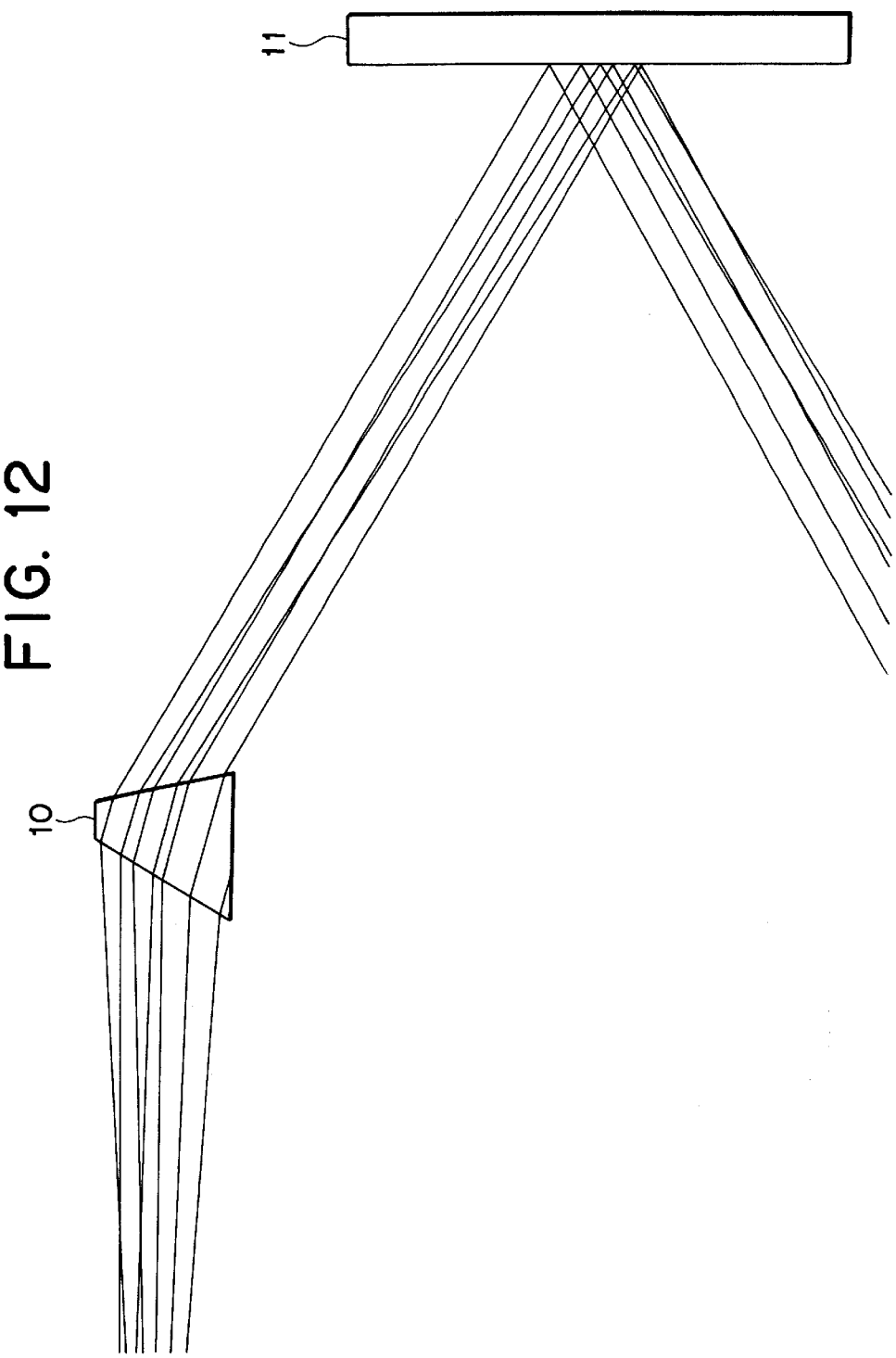
FIG. 12 is a partially enlarged view of FIG. 11, which is a view showing a state in which principal rays of light beam made to be incident onto each lens element while forming a small angle relative to an optical axis is allowed to exit from each lens element while forming a small angle relative to the optical axis.

The present invention is not limited to the foregoing embodiments. In the foregoing embodiments, for example, the front focal plane of the fly-eye optical device 9 is made to be approximately coincident with the incidence plane thereof. However, as in the second modification example shown in FIG. 11 and FIG. 12 that is a partially enlarged view of FIG. 11, a constitution in which the front focal plane of the fly-eye optical device 9 is quite different from the incidence plane thereof can be adopted simply by making the rear focal plane of the fly-eye optical device 9 approximately coincident with the exit plane thereof. In this case, a principal ray of light beam incident onto each lens element 9a' while forming a certain angle relative to the optical axis is allowed to exit from each lens element 9a' while forming a certain angle relative to the optical axis. As a result, owing to this non-telecentric light beam, unevenness in brightness occurs in the illuminated field. However, it is needless to say that a sufficient brightness is secured and the unevenness in brightness in the illuminated field is sufficiently suppressed also in the case of the second modification example, in comparison with those in the prior arts.

Figure 13:
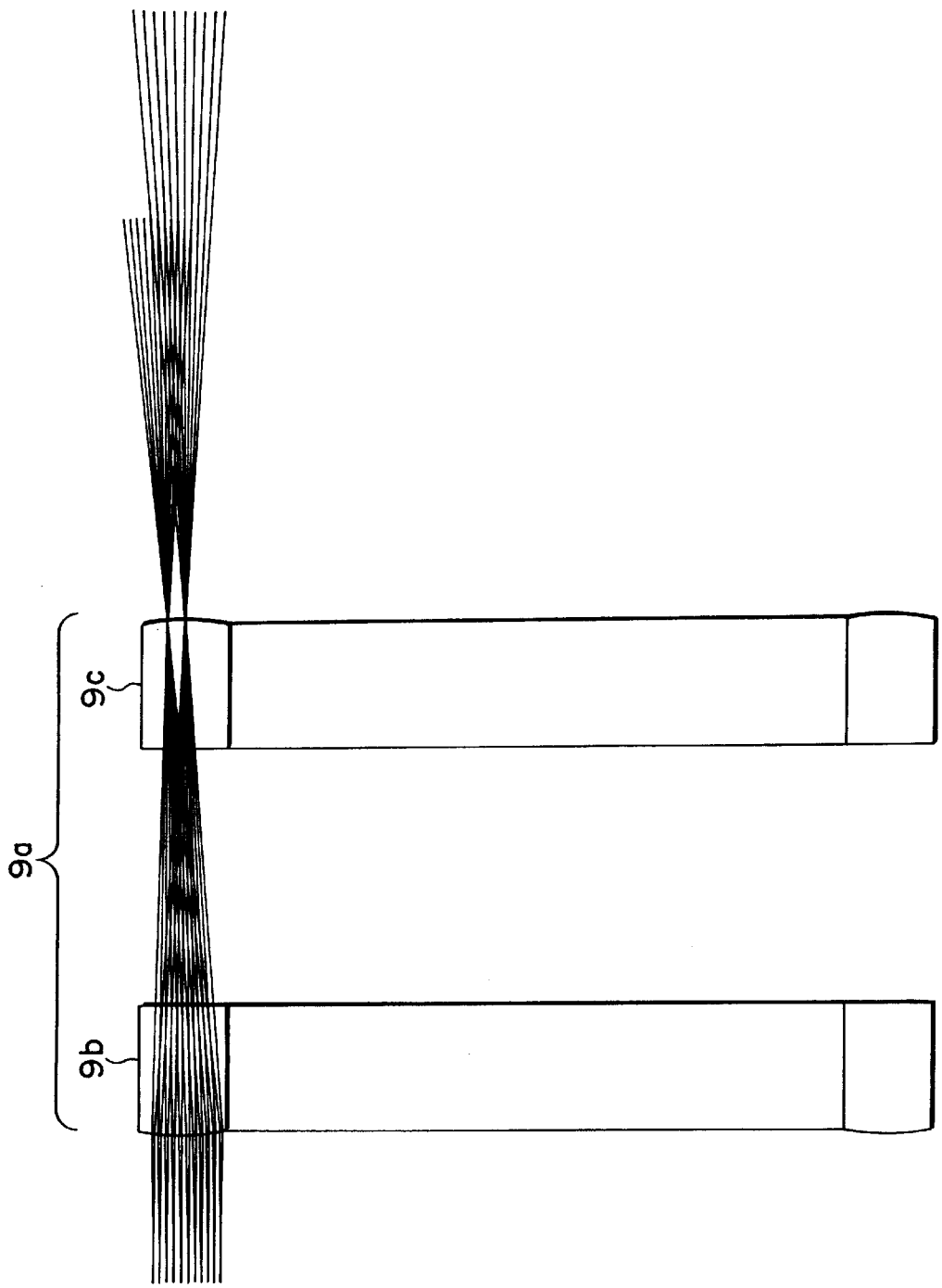
FIG. 13 is a view showing a structure of a principal part of a third modification example, in which each lens element of the fly-eye optical device is composed of a pair of lens components arranged so as to be apart from each other along the optical axis.

Moreover, in the foregoing embodiments, each lens element 9a of the fly-eye optical device 9 is constituted by a single lens. In this case, in order to make an exit plane of each lens element 9a approximately coincident with a rear focal plane thereof, a length of the single lens along an optical axis thereof is comparatively large. Accordingly, when the fly-eye optical device 9 composed of many single lenses 9a is made of plastic and the like by a pressing work for the single lenses so as to integrate them to a one constituent component, an error in manufacturing is more apt to occur as a thickness of the fly-eye lens is larger. As the third modification example shown in FIG. 13, each lens element 9a of the fly-eye optical device 9 can be constituted by a pair of lens components 9b and 9c arranged along the optical axis at an interval so as to be spaced from each other.

In the third modification example, in the lens element 9a constituted by the pair of the lens components 9b and 9c, the front focal plane and the incidence plane are approximately coincident with each other and the rear focal plane and the exit plane are approximately coincident with each other. Accordingly, advantages similar to those in the foregoing embodiments can be exhibited also in the third modification example. In addition, in the case of the third modification example, since the fly-eye optical device is constituted by the two constituent components, a manufacturing error is not more apt to occur as the thickness of each constituent component becomes smaller. Moreover, by interposing air between the lens component 9b and the lens component 9c, a length of each lens element 9a in the direction of the optical axis thereof, that is, a length of the fly-eye optical device 9 in the direction of the optical axis thereof, can be made to be small, so that the fly-eye optical device 9 can be miniaturized.

Moreover, in the foregoing embodiments, many light source images are formed in the vicinity of the exit plane of the fly-eye optical device 9, and the divergent light beams from the many light source images is converted to the approximately parallel luminous flux via the condenser lens 10 and guided into the object plane 11. However, another way may be adopted. Specifically, many light source images are formed on a predetermine plane apart somewhat from the exit plane of the fly-eye optical device 9, and divergent light beams from the many light source images are allowed to pass through the condenser lens 10 and shaped to another divergent light beams having a suitable angle, thus guiding it to the object plane 11. In this case, although the unevenness in brightness in the illuminated field increases compared to the foregoing embodiments, a sufficient brightness can be secured compared to the prior arts, and the unevenness in brightness in the illuminated field can be sufficiently suppressed.

Moreover, in the present invention, in relation to the third modification example in which each lens element 9a of the fly-eye optical device 9 is constituted by the pair of the lens components 9b and 9c, fourth and fifth modification examples can be adopted as described later.

Figure 14:
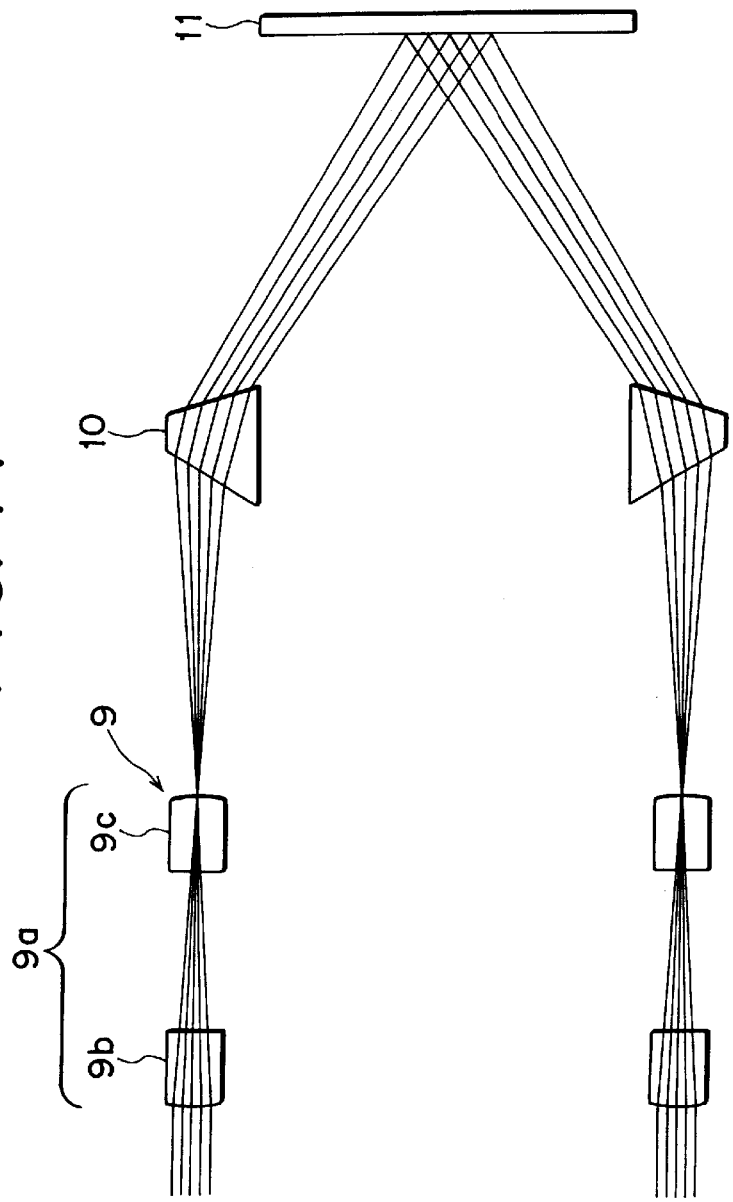
FIG. 14 is a sectional view showing a structure of a principal part of a fourth modification example, which shows a state in which an air space between the pair of lens components constituting each lens element of the fly-eye optical device is comparatively narrow.
Figure 15:
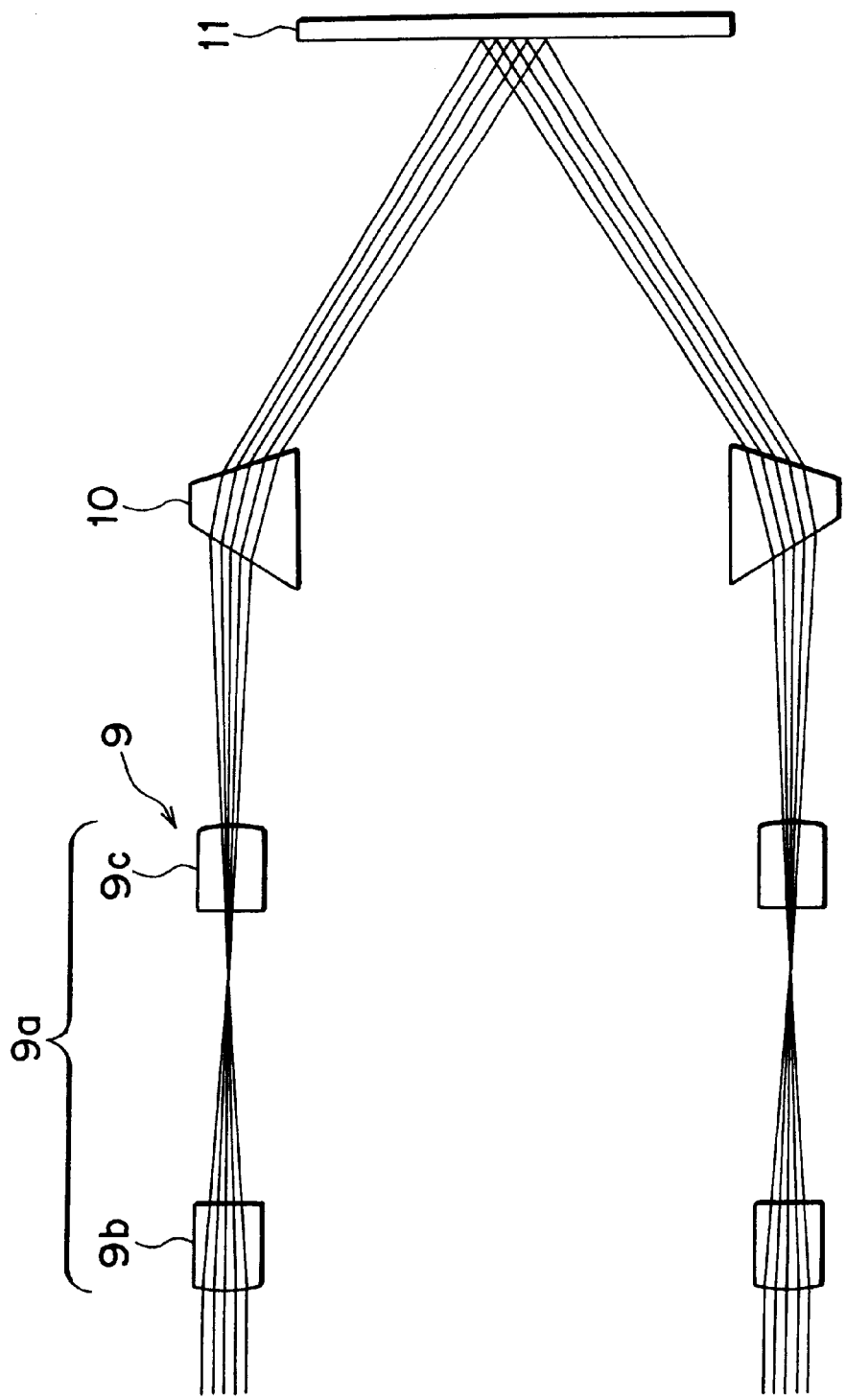
FIG. 15 is a sectional view showing a structure of a principal part of the fourth modification example, which shows a state in which an air space between the pair of lens components constituting each lens element of the fly-eye optical device is comparatively wide.

FIG. 14 is a sectional view showing a constitution of a principal part of the fourth modification example, which shows a state in which an air space between the pair of lens components constituting each lens element of the fly-eye optical device is comparatively narrow. FIG. 15 is a sectional view showing a constitution of a principal part of the fourth modification example, which shows a state in which an air space between the pair of lens components constituting each lens element of the fly-eye optical device is comparatively wide. Furthermore, FIG. 16 is an enlarged perspective view schematically showing a constitution of the fly-eye optical device of FIGS. 14 and 15.

Figure 16:
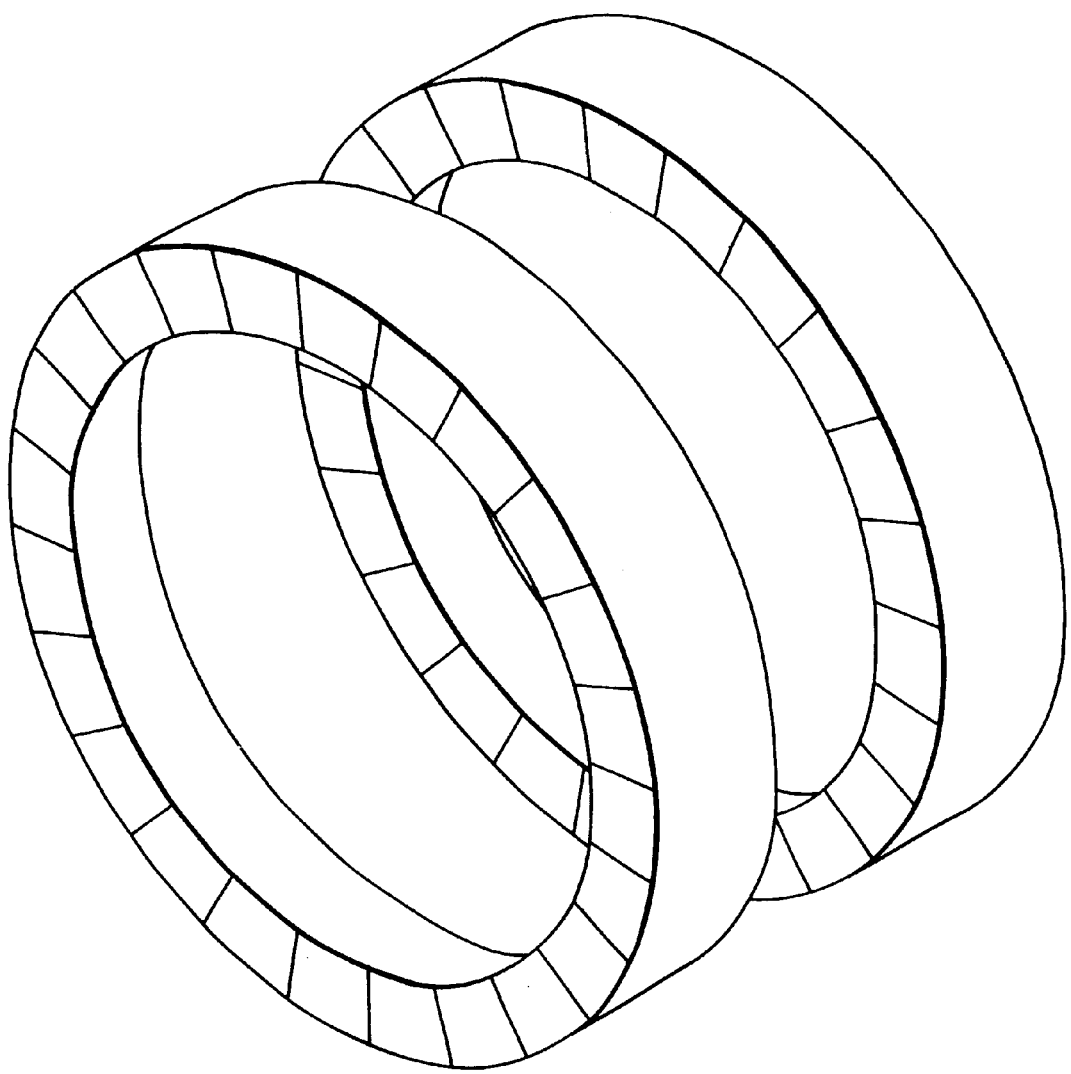
FIG. 16 is an enlarged perspective view schematically showing a structure of the fly-eye optical device of FIGS. 14 and 15.

As shown in FIG. 14 to FIG. 16, in the fourth modification example, the fly-eye optical device 9 is constituted by arranging many lens elements 9a composed of the pair of the lens components 9b and 9c so as to form a cylindrical shape wholly, which are disposed along the optical axis so as to be spaced from each other at an interval, similarly to the third modification example. However, the fourth modification example differs from the third modification example in that the fly-eye optical device is constituted so that the air space between the lens components 9b and 9c can be varied.

First, in the state shown in FIG. 14 in the fourth modification example, many light source images are formed in the vicinity of the exit plane of the fly-eye optical device 9 similarly to the third modification example. The divergent light beams from the many light source images is guided into the object plane 11 via the condenser lens 10, and a comparatively large illuminated field is formed on the object plane 11.

Contrary to this, in the state shown in FIG. 15, in order to increase the air space between the lens components 9b and 9c which constitute each lens element 9a, the lens component 9c closer to the object plane 11 than the lens element 9b is moved toward the object plane 11. As a result, in the state shown in FIG. 15, a divergence angle of the light beams which exit from the fly-eye optical device 9 to be incident onto the condenser lens 10 becomes smaller than that shown in FIG. 14, and a size of the illuminated field formed on the object plane 11 is smaller than that of FIG. 14.

Accordingly, although an illustration is omitted, when the lens component 9c closer to the object plane than the lens component 9b is moved toward the light source initially in the state of FIG. 14 in order to reduce the air space between the lens components 9b and 9c, the divergence angle of the light beams which exit from the fly-eye optical device 9 to be incident onto the condenser lens 10 becomes larger than that shown in FIG. 14, and the size of the illuminated field formed on the object plane 11 becomes larger than that shown in FIG. 14.

As described above, in the fourth modification example, when the air space between the pair of the lens components 9b and 9c constituting each lens element 9a is varied, a composite focal length of the pair of the lens components varies, and the divergence angle of the light beams which are allowed to exit from the fly-eye optical device 9 and incident onto the condenser lens 10 will be varied. As a result, by varying the air space between the pair of the lens components 9b and 9c, the size of the illuminated field formed on the object plane 11 can be adjusted without varying a gap between the condenser lens 10 and the object plane 11, that is, a working distance.

FIG. 17 is a sectional view showing a constitution of a principal part of a fifth modification example, which shows a state in which an air space between the pair of the lens components constituting each lens element of the fly-eye optical device is comparatively narrow. Moreover, FIG. 18 is a sectional view showing a constitution of a principal part of the fifth modification example, which shows a state in which an air space between the pair of the lens components constituting each lens element of the fly-eye optical device is comparatively wide.

The fifth modification example has a constitution similar to that of the fourth modification example. However, the fourth modification example uses a ring-shaped condenser lens as the light collection optical system. Compared to this, the fifth modification example differs from the fourth modification example only in that a ring-shaped parabola concave reflection mirror is used as the light collection optical system.

Accordingly, in the state shown in FIG. 17 in the fifth modification example, that is, in the state corresponding to FIG. 14 of the fourth modification example, many light source images are formed in the vicinity of the exit plane of the fly-eye optical device 9, and divergent light beams from the many light source images passes through the parabola concave reflection mirror 10a to be guided into the object plane 11. Then, a comparatively large illuminated field is formed on the object plane 11.

Contrary to this, in the state shown in FIG. 18, that is, in the state corresponding to FIG. 15 of the fourth modification example, in order to increase the air space between the lens components 9b and 9c which constitute each lens element 9a, the lens component 9c closer to the object plane 11 than the lens element 9b is moved toward the object plane 11. As a result, in the state shown in FIG. 18, a divergence angle of the light beams which is allowed to exit from the fly-eye optical device 9 to be incident onto the parabola concave reflection mirror 10a becomes smaller than that shown in FIG. 17, and a size of the illuminated field formed on the object plane 11 is smaller than that of FIG. 17.

As described above, also in the fifth modification example, by varying the air space between the pair of the lens components, the size of the illuminated field formed on the object plane 11 can be adjusted without varying a working distance similarly to the fourth modification example.

Note that in the foregoing embodiments and the foregoing modification examples, the lens elements constituting the fly-eye optical device 9 are arranged so as to form the cylindrical shape wholly. However, the fly-eye optical device 9 needs not to be necessarily cylindrical, and as long as the plurality of lens elements are arranged collectively so as to form the ring shape, the same effects can be obtained. Accordingly, the plurality of lens elements, for example, may be arranged at intervals on a circumference of a circle. Alternatively, the plurality of lens elements may be arranged at intervals or adjacently so as to form two semi circles.

Although a secondary light sources are formed using the fly-eye optical device 9 in the foregoing embodiments and the foregoing modification examples, the same effects can be obtained by replacing the fly-eye optical device 9 with a diffraction optical device or a micro lens array. Here, the diffraction optical device is constituted by arranging a plurality of small phase patterns, transmittance patterns, refractive index patterns or the like. By suitably setting the characteristics of the phase patterns and the transmittance patterns incorporated in such a diffraction optical device, a ring-shaped light intensity distribution which is incident only onto a ring-shaped incidence plane of the condenser lens 10 can be obtained.

What is claimed is:

1. A dark field illumination apparatus comprising:
   a light source to supply an illumination light;
   a shaping system to shape a light beam from said light source to an approximately parallel beam having a ring-shaped section;
   a wavefront splitting type optical integrator having a plurality of elements, which forms a plurality of light source images based on the approximately parallel beam having the ring-shaped section which is incident onto an incidence plane of the plurality of elements, the light source images being arranged circularly on a predetermined plane; and
   a light collection optical system to collect light beams from said plurality of light source images formed on said predetermined plane to superimpose the collected light beams on an object plane,
   a rear focal plane of said wavefront splitting type optical integrator and a front focal plane of said light collection optical system being disposed so as to be approximately coincident with each other, a curvature radius of an incidence plane of the optical integrator and a curvature radius of an exit plane of the optical integrator being equal to each other, the predetermined plane being the exit plane, and the rear focal plane of the optical integrator and the exit plane of the optical integrator being substantially coincident with each other.

2. A dark field illumination apparatus according to claim 1,
   wherein said optical integrator is a fly-eye optical device having a plurality of at least two divergent lens elements.

3. A dark field illumination apparatus according to claim 2,
   wherein said fly-eye optical device forms the plurality of light source images in the vicinity of exit planes of the plurality of lens elements.

4. A dark field illumination apparatus according to claim 2, wherein each of the plurality of lens elements is composed of a plurality of lens components disposed at intervals along a reference optical axis, and an air space between the lens components can be varied.

5. A dark field illumination apparatus according to claim 2,
   wherein the plurality of lens elements constituting said fly-eye optical device are disposed so as to form a cylindrical shape wholly.

6. A dark field illumination apparatus according to claim 1,
   wherein a front focal plane of said optical integrator and said object plane are disposed so as to be approximately conjugated with each other.

7. A dark field illumination apparatus according to claim 1,
   wherein in said optical integrator, a front focal plane and said incidence plane are approximately coincident with each other.

8. A dark field illumination apparatus according to claim 1,
   wherein said dark field illumination apparatus performs a dark field illumination for an object by a light beam having a numerical aperture larger than that of an object lens of a microscope,
   and said optical integrator and said light collection optical system are positioned so as to be closer to said object than to a mounting surface of said object lens.

9. A dark field illumination apparatus according to claim 8, wherein said optical integrator and said light collection optical system are fitted to each of a plurality of object lenses integrally with each other, the plurality of object lenses being positioned selectively on an image formation optical path of said microscope.

10. A dark field illumination apparatus according to claim 1, wherein said light collection optical system has a ring-shaped lens component, and at least one of planes of the lens component is formed to be aspheric.

11. A dark field illumination apparatus according to claim 1, wherein said light collection optical system has a ring-shaped concave reflection mirror, and a reflection plane of the concave reflection mirror is formed to be parabolic.

12. A dark field illumination type microscope comprising:

a light source to supply an illumination light;

a shaping system to shape a light beam from said light source to an approximately parallel beam having a ring-shaped section;

a wave front splitting optical integrator having a plurality of elements, which forms a plurality of light source images circularly arranged on a predetermined plane, based on said approximately parallel light beam having said ring-shaped section, the approximately parallel light beam being incident onto an incidence plane of said plurality of elements;

a light collection optical system to collect light beams from light source images formed on said predetermined plane, and to superimpose the light beams on an object plane; and an object lens to collect a light beam having a numerical aperture smaller than that of the light beams which are allowed to be incident onto said object plane by said light collection optical system, a rear focal plane of said wavefront splitting type optical integrator and a front focal plane of said light collection optical system being disposed so as to be approximately coincident with each other, a curvature radius of an incidence plane of the optical integrator and a curvature radius of an exit plane of the optical integrator being equal to each other, the predetermined plane being the exit plane, and the rear focal plane of the optical integrator and the exit plane of the optical integrator being substantially coincident with each other.

* * * * *